(12) United States Patent  
Lincoln

(10) Patent No.: US 6,301,226 B1  
(45) Date of Patent: Oct. 9, 2001

(54) ASYNCHRINOUS TRANSFER MODE SYSTEM AND METHOD

(75) Inventor: Bradford C. Lincoln, Boulder, CO (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/416,240

(22) Filed: Oct. 12, 1999

Related U.S. Application Data

(63) Continuation of application No. 08/756,950, filed on Dec. 2, 1996, now Pat. No. 5,991,265.

(51) Int. Cl.⁷ ............................................. H04J 3/02
(52) U.S. Cl. ..................... 370/229; 370/395; 370/391
(58) Field of Search ................................. 370/229, 230, 370/231, 232, 233, 234, 236, 235, 391, 395, 401, 905, 358, 384

(56) References Cited

U.S. PATENT DOCUMENTS

| | | | |
|---|---|---|---|
| 5,457,687 | * 10/1995 | Newman | 370/232 |
| 5,701,291 | * 12/1997 | Roberts | 370/232 |
| 5,706,288 | * 1/1998 | Radhakrishnan et al. | 370/418 |
| 5,751,697 | * 5/1998 | Radhakrisnan et al. | 370/229 |
| 5,777,984 | * 7/1998 | Gun et al. | 370/230 |
| 5,812,527 | * 9/1998 | Kline et al. | 370/232 |
| 5,940,375 | * 8/1999 | Soumiya et al. | 370/249 |
| 5,991,265 | * 11/1999 | Lincoln | 370/229 |
| 6,002,668 | * 12/1999 | Miyoshi et al. | 370/232 |
| 6,034,945 | * 3/2000 | Hughes et al. | 370/230 |
| 6,049,526 | * 4/2000 | Radhakrishnan et al. | 370/229 |

* cited by examiner

Primary Examiner—Alpus H. Hsu
Assistant Examiner—Brian Nguyen
(74) Attorney, Agent, or Firm—Kelly H. Hale; Keith Kind

(57) ABSTRACT

An ATM system transmits different types of cells (data, forward resource management (RM) and backward RM) from station A through switch(es) to station B. Different fields in an Available Bit Rate (ABR) table provide controls over the rate of such cell transmissions. First particular field values in such table control the selection of successive ones of cell decision blocks which determine the type of cell to be transmitted. Second particular field values in such table control the selection of one of a plurality of entries in an exponent table which also provides other parameter values controlling the generation of an explicit rate. Third particular field values in the ABR table control the selection of an individual one of a plurality of rate decision blocks each indicating an individual rate of cell transmission from the station A to the station B. Each of the rate decision blocks includes a plurality of fields which control changes from the individual one of the rate decision blocks to a rate decision block generally providing a reduced rate of cell transmission. These changes are dependent in part upon the relative times for the reception and transmission by the station of the different types of cells. One step in controlling the cell transmission rate is to select the lower one of the explicit rate and the rate indicated in the individual one of the rate decision blocks. By providing these controls, an optimal, but not excessive, rate is selected to transmit the different cells.

24 Claims, 18 Drawing Sheets

2.0 ABR END STATION STRUCTURE

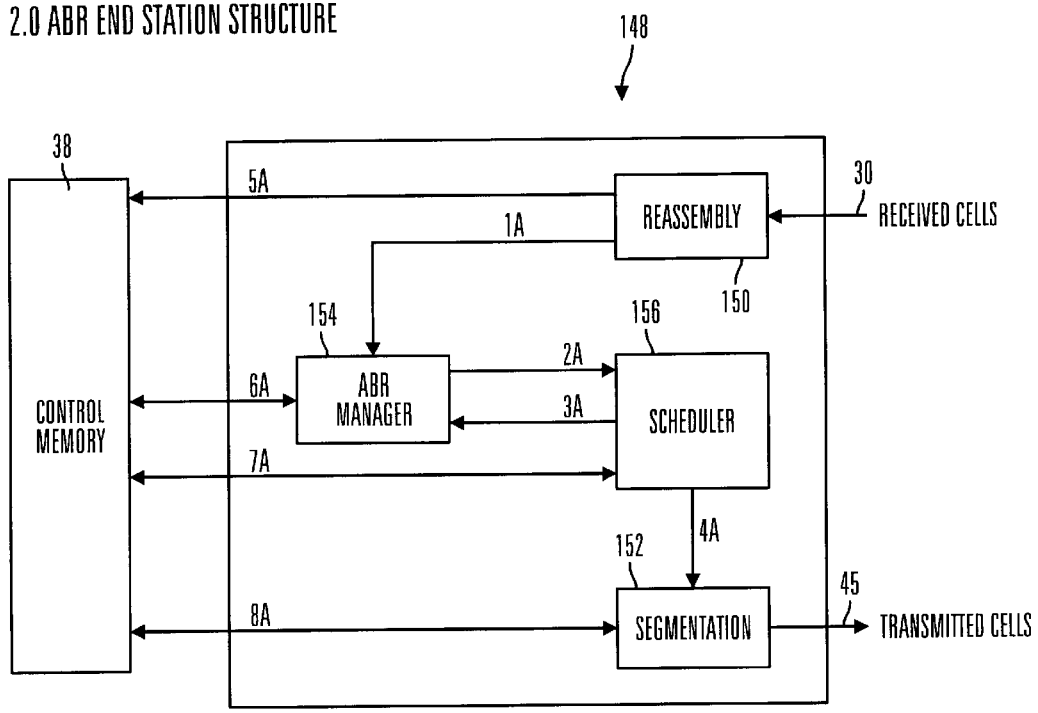

1A. FORWARD RM CELL: CONNECTION NUMBER
    BACKWARD RM CELL: CONNECTION NUMBER, ER, CI, NI, BN
2A. CELL TYPE (DATA, FORWARD RM, BACKWARD RM)
3A. CONNECTION NUMBER
4A. CONNECTION NUMBER, CELL TYPE (DATA, IN RATE FORWARD RM, IN RATE BACKWARD RM,
OUT OF RATE FORWARD RM, OUT OF RATE BACKWARD RM).
5A. FORWARD RM TURN AROUND INFORMATION.
6A. ABR STATE AND RATE UPDATES
7A. ABR STATE AND RATE UPDATES
8A. BACKWARD RM CELL DATA (WRITTEN BY REASSEMBLY) AND ACR FIELD VALUE IN FORWARD RM CELLS.

THE SCHEDULER PROVIDES VARIABLE RATE BASED SCHEDULING, TCR RATE SCHEDULING AND QUEUE BASED SCHEDULING. THE RATE BASED SCHEDULING IS USED FOR DATA CELLS, IN RATE FORWARD RM CELLS AND IN RATE BACKWARD RM CELLS. THE TCR RATE SCHEDULING IS USED FOR OUT OF RATE FORWARD RM CELLS. THE QUEUE BASED SCHEDULING IS USED FOR OUT OF RATE BACKWARD RM CELLS.

FIG. 6

TABLE 1. ABR STATE FIELDS

| FIELD | DESCRIPTION |
|---|---|
| DATA AVAILABLE | DATA FOR DATA CELL IS PENDING SEGMENTATION. |
| SCHEDULER PERIOD | TIME BETWEEN CELLS FOR RATE SCHEDULER. |
| MCR PERIOD | MAXIMUM TIME BETWEEN CELLS BEFORE MCR PRIORITY INCREASE. |
| CONGESTION INDEX | INDEX INTO HOST CONGESTION STATE FOR BACKWARD ER REDUCTION. |
| SCHEDULE FORWARD OUT OF RATE | USE LOW RATE SCHEDULER TO SEND OUT OF RATE FORWARD RM CELLS TO RESTART CONNECTION. |
| BACKWARD PENDING | BACKWARD RM CELL PENDING TRANSMISSION. |
| BACKWARD TRANSMITTED | BACKWARD RM CELL TRANSMITTED SINCE LAST FORWARD RM CELL TRANSMITTED. |
| LAST FORWARD RM TIME | TIME OF LAST IN RATE FORWARD RM TRANSMISSION. |
| POST FORWARD CELL POSITION | CDB POSITION TO STORE IN CURRENT CELL POSITION AFTER TRANSMITTING FORWARD RM CELL. |
| CURRENT CELL POSITION | INDICATES CDB TO USE FOR NEXT CELL DECISION. INCREMENTED TO NEXT CDB AFTER CELL TRANSMISSION EXCEPT FOR FORWARD RM CELL. |
| EXPONENT TABLE POSITION | INDICATES EXPONENT TABLE USED TO MAP BETWEEN ER IN FLOATING POINT AND A RDB RATE. |
| RATE POSITION | INDICATES RDB FOR CONNECTION'S CURRENT RATE. |
| CRM | ABR PARAMETER VALUE. |
| UNACKNOWLEDGED FORWARD RM | NUMBER OF FORWARD RM CELLS TRANSMITTED SINCE LAST BACKWARD RM CELL WITH BN = 0 WAS RECEIVED. |
| BACKWARD RM CONTENT | CONTENTS OF THE PENDING BACKWARD RM CELL SUPPLIED BY THE REASSEMBLY MACHINE WHEN A FORWARD RM IS RECEIVED. |

FIG. 8

TABLE 2. CELL DECISION BLOCK (CDB) FIELDS

| BIT | DESCRIPTION |
|---|---|
|  | EACH ENTRY CONTAINS THE TYPE OF CELL (DATA, FORWARD RM OR BACKWARD RM) TO TRANSMIT UNDER SPECIFIC CIRCUMSTANCES. THERE ARE 16 ENTRIES INDEXED BY A 4 BIT NUMBER. |
| 0 | DATA IS AVAILABLE. |
| 1 | BACKWARD RM CELL HAS BEEN TRANSMITTED SINCE THE LAST FORWARD RM WAS TRANSMITTED. |
| 2 | PENDING BACKWARD RM CELL IS AVAILABLE. |
| 3 | TIME SINCE LAST FORWARD RM TRANSMISSION IS GREATER THAN TRM. |

FIG. 9

TABLE 3. RATE DECISION BLOCK (RDB) FIELDS

| FIELD | DESCRIPTION |
| --- | --- |
| BELOW SCHEDULE | INDICATES RATE IS BELOW MINIMUM RATE OF SCHEDULER. SETS SCHEDULE FORWARD OUT OF RATE IN THE ABR STATE FOR THE CONNECTION. |
| CONGESTION ER | NEW ER FIELD VALUE FOR THE TRANSMITTED BACKWARD RM WHEN THE HOST SYSTEM IS CONGESTED. |
| ACR | ACR IN FLOATING POINT FORMAT USED FOR GENERATING FORWARD RM CELLS. |
| QUIET RATE | INDICATES NEW VALUE FOR RATE POSITION WHEN QUIET TIME OUT EXCEEDED. |
| QUIET TIME OUT | QUIET RATE VALUE USED WHEN THE TIME SINCE LAST FORWARD RM TRANSMISSION IS GREATER THAN QUIET TIME OUT. THIS TIME OUT VALUE IS A FUNCTION OF THE CURRENT RATE (SINCE IT IS STORED FOR EACH RDB). |
| ADDITIVE RATE | INDICATES NEW VALUE FOR RATE POSITION WHEN BACKWARD RM CELL RECEIVED WITH CI = 0, NI = 0. |
| CI RATE | INDICATES NEW VALUE FOR RATE POSITION WHEN BACKWARD RM CELL RECEIVED WITH CI = 1. |
| ADTF RATE | INDICATES NEW VALUE FOR RATE POSITION WHEN A FORWARD RM IS ABOUT TO BE TRANSMITTED AND THE TIME SINCE LAST FORWARD RM TRANSMISSION IS GREATER THAN ADTF. |
| CRM RATE | INDICATES NEW VALUE FOR RATE POSITION WHEN A FORWARD RM IS ABOUT TO BE TRANSMITTED AND UNACKNOWLEDGED FORWARD RM IS GREATER THAN OR EQUAL TO CRM. |
| ADTF/CRM RATE | INDICATES NEW VALUE FOR RATE POSITION WHEN A FORWARD RM IS ABOUT TO BE TRANSMITTED AND UNACKNOWLEDGED FORWARD RM IS GREATER THAN OR EQUAL TO CRM AND THE TIME SINCE LAST FORWARD RM TRANSMISSION IS GREATER THAN ADTF. |

FIG. 10

ASYNCHRINOUS TRANSFER MODE SYSTEM AND METHOD

CROSS REFERENCE TO RELATED APPLICATION

This application is a continuation of application Ser. No. 08/756,950, filed Dec. 2, 1996, now U.S. Pat. No. 5,991,265.

This invention relates to a system for, and method of, generating different types of cells preferably in an asynchronous transfer mode (ATM) format. The invention is especially concerned with the scheduling of cell transmission so that the cells are transmitted at an optimal, but not excessive, rate.

BACKGROUND OF THE INVENTION

Telephone systems in the United States provide a central office for receiving signals from calling telephones within a particular radius such as one (1) to two (2) miles from the central office and for transmitting telephone signals to such telephones. The telephone signals from a calling telephone are then transmitted through long distances from such central office. The telephone signals then pass to the receiving telephone through a second central office within a radius of one (1) mile to two (2) miles from such central office.

The telephone signals are transmitted long distances between central offices through optical fibers which have replaced other media previously provided for such purposes. The optical fibers have certain distinctive advantages over the lines previously provided. They allow a significantly increased number of signals from different telephones to be transmitted at the same time through the optical fibers. They pass the digitally-encoded signals with a higher accuracy than other media.

Various systems have been adopted to carry digitally-encoded signals for telephone, video and data services. One of such systems now being adopted is designated as asynchronous transfer mode (ATM). This system is advantageous because it recognizes that generally signals travel in only one direction at any one time between a calling subscriber and a receiving subscriber. The system preserves bandwidth in the other direction so that a maximum number of different messages can be transmitted in such other direction.

Various rules have been provided in the prior art to control the regulation of the rates at which the cells are transmitted through the switch(es) between the stations A and B. These rules have involved a significant number of different parameters. These rules have required the performance of calculations involving these different parameters in order to obtain at each instant an indication of the optimal rate, but without any congestion, for the data transmission. The performance of these calculations in the prior art has been relatively slow. A considerable amount of hardware and software has also been required to perform the calculations. Furthermore, the system performing these calculations has been relatively inflexible. For example, when the calculations involve equations, the system is not able to adapt easily if and when changes are made in the equations.

In ATM systems, cells are provided to transmit information between access multiplexes or terminals through central offices or other switching systems. There are different types of cells. For example, when cells are to be transmitted from a station A to a switch B through a switch or a sequence of switches, forward resource management (RM) cells are transmitted from the station A to the station B and backward resource management cells are transmitted from the station B to the station A. Data cells are also transmitted between the station A and the station B.

The switches connected between the stations A and B sometimes provide congestion in the transmission of the cells between the stations A and B. This congestion results in part from loads produced on the switches from different sources which are connected to the switches. The resource management cells provide rate information which is used to control the rates at which the cells are transmitted between the switches A and B so that the cells will be transmitted at an optimal rate, but without any congestion, in the path between the switches A and B.

BRIEF DESCRIPTION OF THE INVENTION

In one embodiment of the invention, an ATM system transmits different types of cells (data, forward resource management (RM) and backward RM) from station A through switch(es) to station B. Different fields in an Available Bit Rate (ABR) table provide controls over the rate of such cell transmissions. First particular field values in such table control the selection of successive ones of cell decision blocks which determine the type of cell to be transmitted. Second particular field values in such table control the selection of one of a plurality of entries in an exponent table which also provides other parameter values controlling the generation of an explicit rate. Third particular field values in the ABR table control the selection of an individual one of a plurality of rate decision blocks each indicating an individual rate of cell transmission from the station A to the station B.

Each of the rate decision blocks includes a plurality of fields which control changes from the individual one of the rate decision blocks to a rate decision block generally providing a reduced rate of cell transmission. These changes are dependent in part upon the relative times for the reception and transmission by the station of the different types of cells. One step in controlling the cell transmission rate is to select the lower one of the explicit rate and the rate indicated in the individual one of the rate decision blocks. By providing the controls specified above, an optimal, but not excessive, rate is selected to transmit the different cells.

BRIEF DESCRIPTION OF THE DRAWINGS

In the drawings:

FIG. 6 is a schematic block diagram of a system implementing the system shown in FIG. 5 to provide for the transmission of the different types of cells between the stations A and B at an optimal, but not excessive, rate and specifying the operation of individually numbered lines or buses in FIG. 6;

FIG. 8 is a table providing concise definitions of each of the different fields included in the Available Bit Rate (ABR) table shown in FIG. 7;

FIG. 9 is a table providing concise definitions of the significance of each of the four (4) binary bits schematically shown in a number of the sub-blocks in one of the Cell Decision Blocks (CDB) of FIG. 7;

FIG. 10 is a table providing concise definitions of the different fields included in each of Rate Decision Blocks shown in FIG. 7;

DETAILED DESCRIPTION OF THE INVENTION

Figure 1:
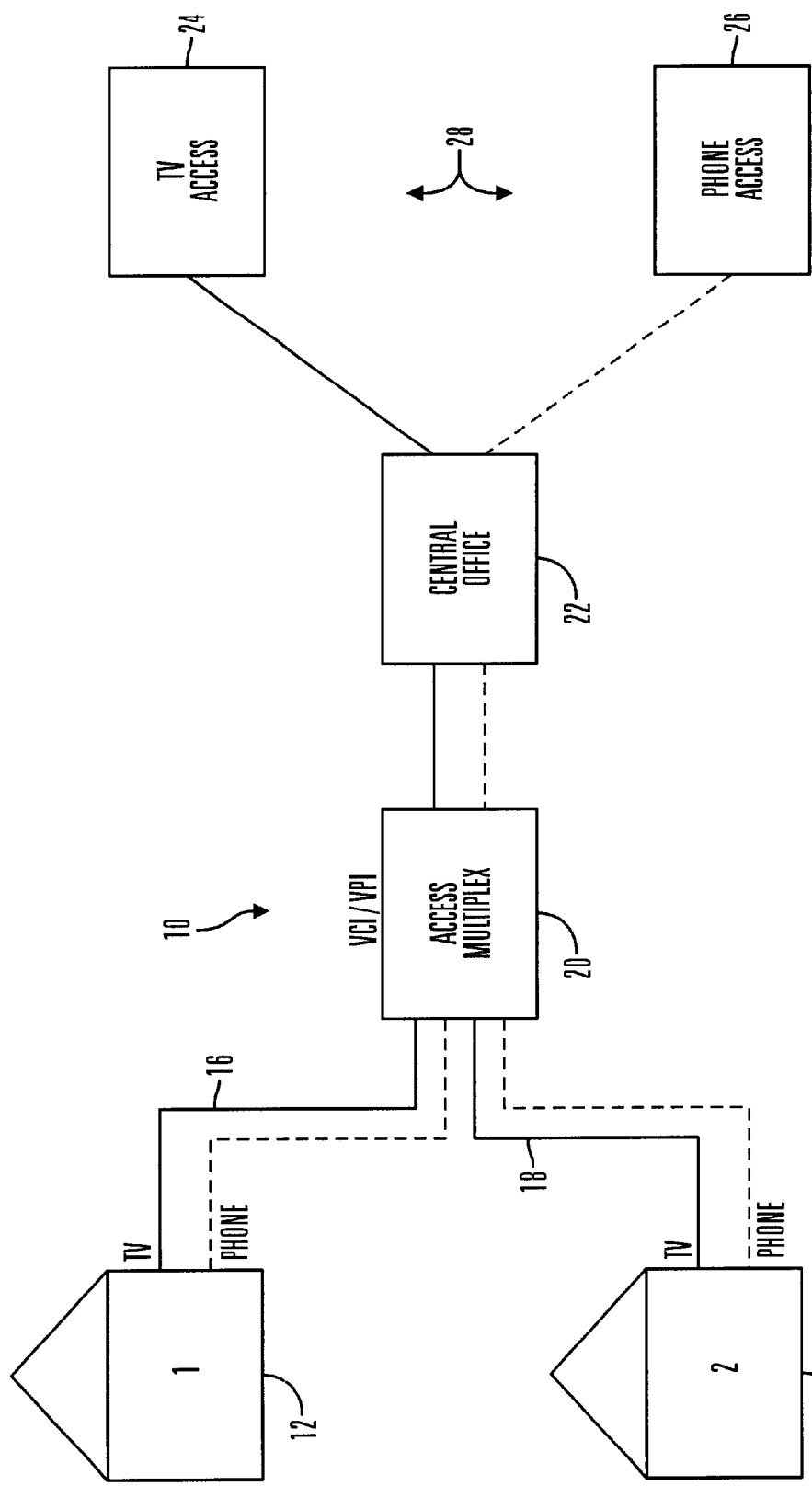
FIG. 1 is a schematic block diagram illustrating on a simplified basis the paths for transferring cells of information in an asynchronous transfer mode between a calling station and a receiving station through an access multiplex.

FIG. 1 illustrates in block form a system generally indicated at 10 and known in the prior art for transferring signals to and from a pair of telephones (or sources) 12 and 14 respectively through lines 16 and 18 to a common access multiplex 20. The telephone (or source) 12 may illustratively transmit or receive television signals and telephone (voice) signals on a line 16 and the telephone (or source) 14 may illustratively transmit or receive television signals and telephone (voice) signals on a line 18. All signals are digitally encoded. For purposes of simplification, the television signals are shown in FIG. 1 as being transferred in solid lines and the telephone signals are shown in FIG. 1 as being transferred in broken lines.

The signals in the lines 16 and 18 pass to the access multiplex 20. The respective digitally-encoded transmit signals are segmented into fixed-length cell payloads; and a cell header is added to each cell payload to form a cell. Similarly, received cells are reassembled into the respective receive cells. The headers of the cells are generated in the access multiplex to provide a virtual channel indication and/or a virtual path indication. The header indicates the path which is being followed to pass the cells to a central office 22. The central office 22 may modify the header again in the cells to identify the path through which the cells are subsequently being transferred. The cells may then be transferred either to a television access 24 or to a telephone access 26 at receiving stations generally indicated at 28 in FIG. 1.

Figure 2:
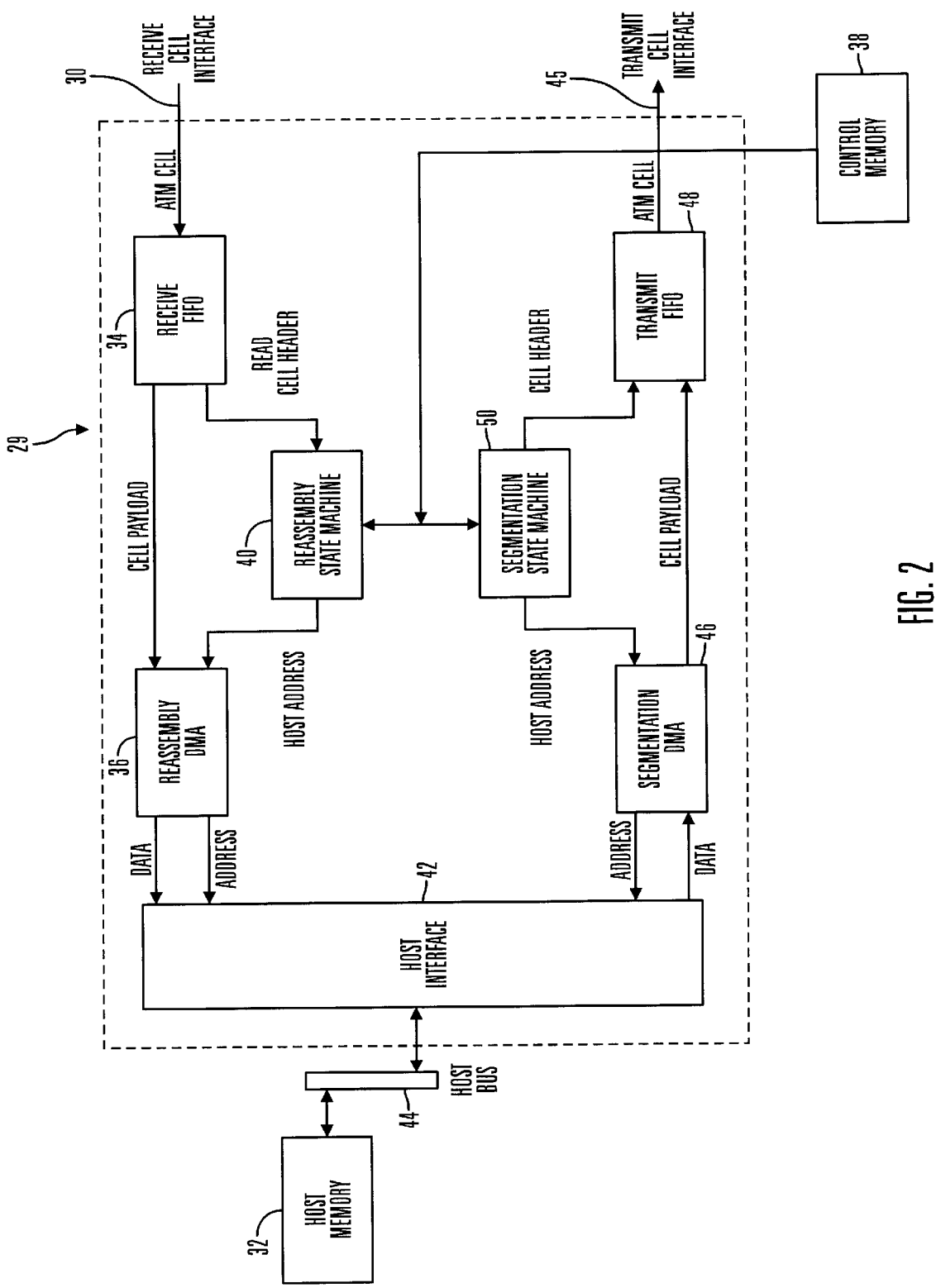
FIG. 2 is a schematic block diagram on a simplified basis of a sub-system included in the system shown in FIG. 1 for transferring cell payloads between a transmit cell interface and a host memory while processing the headers of the cells to control changes in the path of such transfer.

FIG. 2 illustrates one embodiment of a sub-system generally indicated at 29 and enclosed within a rectangle defined by broken lines for use with the access multiplex 20 shown in FIG. 1 for providing a controlled transfer of ATM cell payloads between a line 30 from a receive cell interface and a host memory 32. When the cells are transferred from the line 30, the cells pass through a receiver FIFO 34. The FIFO 34 constitutes a first-in-first-out memory well known in the art to provide a time buffer. The payload in each cell then passes to a reassembly direct memory access (DMA) stage 36. The header in each cell passes to a reassembly state machine 40 for processing.

The header in each cell is introduced from the reassembly state machine 40 to a control memory 38 which processes the header to provide addresses that indicate where the cell payloads are to be stored in the host memory 32. The addresses are then applied through the reassembly state machine 40 to the reassembly direct memory access (DMA) stage 36 to direct the payload from the FIFO 34 through a host interface 42 to a host bus 44. The cells are then transferred in the host memory 32 to the addresses indicated by the control memory 38.

Cells may also be transferred to a transmit cell interface through a line 45 by the sub-system 29 shown in FIG. 2. The segmentation state machine 50 reads addresses from the control memory 38 that indicate where cell payloads are stored in the host memory 32. The addresses are then applied by the segmentation state machine 50 to the segmentation direct memory access (DMA) 46 to direct the cell payloads to the transmit FIFO 48. The transmit FIFO 48 may be constructed in a manner similar to the receive FIFO 34. The header is introduced by the control memory 38 to the segmentation state machine 50 for combination in the transmit FIFO 48 with the payload. The recombined cell then passes to the transmit cell interface line 45.

Figure 3:
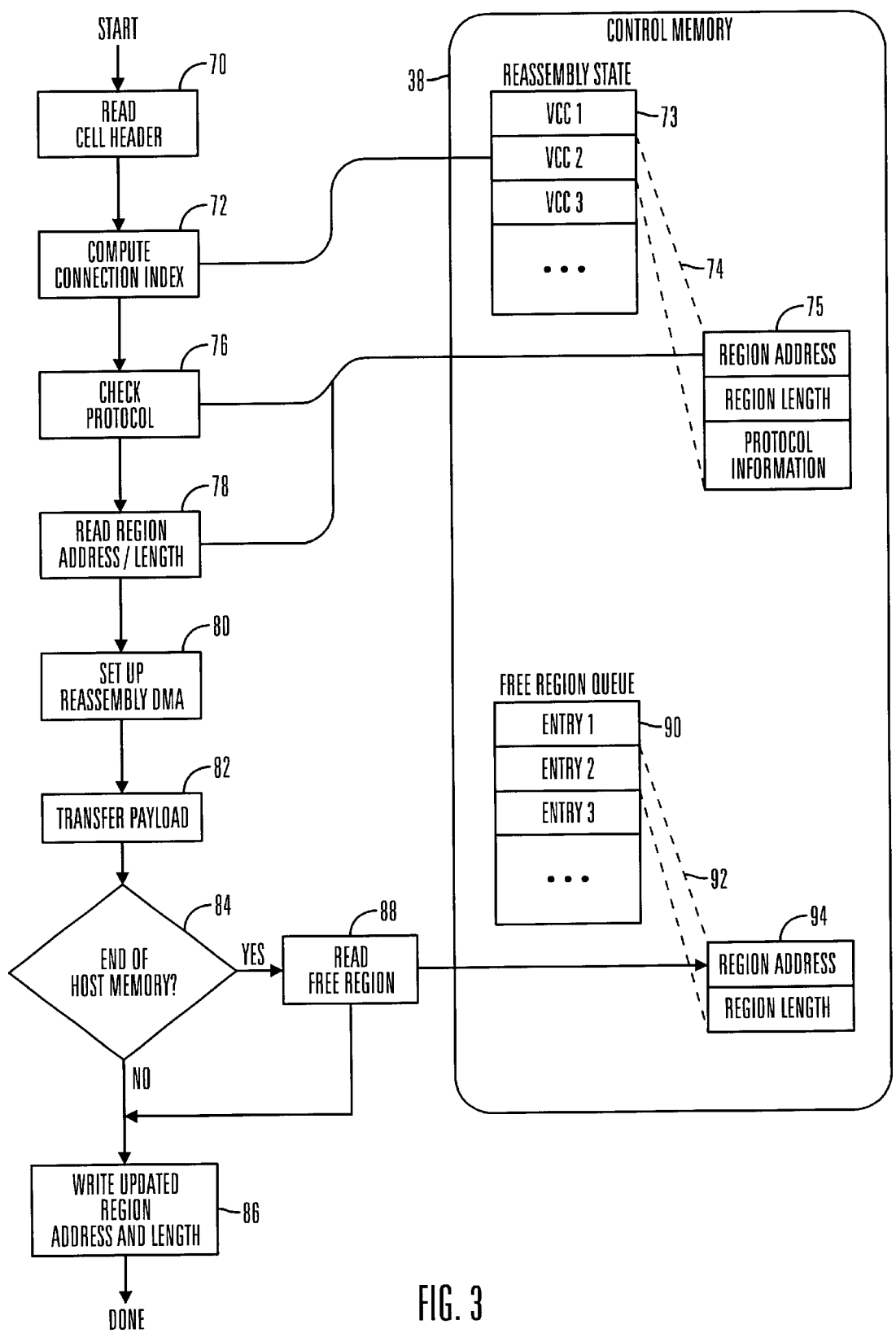
FIG. 3 is a schematic block diagram showing in additional detail the operation of the sub-system shown in FIG. 2 when the cell payloads are transferred from the receive cell interface to the host memory.

FIG. 3 illustrates in additional detail the operation of the sub-system shown in FIG. 2 in separating the header and the payload in a cell, reassembling the cell payloads and recording the reassembled payloads in the host memory 32. In the flow chart shown in FIG. 3, the cell header is initially read as at 70. The header is used to compute a "connection index" (see block 72) to yield a memory address in a reassembly state. This is indicated as a table 73 designated as "Reassembly State" in the control memory 38. The table 73 contains a plurality of virtual channel connections which are respectively designated as "VCC 1", "VCC 2", "VCC 3", etc.

Each of the virtual channel connections contains a table 75 which provides certain information including the address of a region of the host memory 38, the length of the region in the host memory and the protocol information for the virtual channel connection VCC. FIG. 3 schematically shows that the table containing the address region in the host memory 38, the length of the region and the protocol information for the virtual channel connection VCC are being selected from the virtual channel connection designated as "VCC 2". This is indicated by broken lines at 74 and by the table 75 in FIG. 3. It will be appreciated that this is schematic and illustrative and that other VCC's may be selected.

The cell from the line 30 in FIG. 2 relating to the receive cell interface is then checked with the protocol information in the VCC 2 virtual channel connection in the table 75 in the control memory 38 as indicated at 76 in FIG. 3. If the check indicates that the protocol information in the header and the payload is correct, the region address in the host memory 32 and the length of such region are read from the VCC 2 block in the control memory 38 as indicated at 78 in FIG. 3. The region address in the host memory 32 is passed to the reassembly DMA 36 in FIG. 2 as indicated at 80. The reassembly DMA 36 is then activated to transfer the cell payload from the receive FIFO 34 in FIG. 2 to the host memory 32 as indicated at 82 in FIG. 3.

As the successive cell payloads for the VCC 2 table 73 are reassembled in the region, a check is made in each reassembly to determine if the end of the region in the VCC 2 channel connection has been reached. This is indicated at 84 in FIG. 3. If the answer is "No", the region address for successive cells is incremented for the successive payloads in the VCC 2 channel connection recorded in the host memory region and the region length is decremented by the same amount. A block 86 in FIG. 3 indicates this.

If the end of the region in the VCC 2 table in the control memory 38 has been reached, a "Yes" indication is provided from the block 84. This causes a block 88 to be activated in FIG. 3. This block is designated as "Read Free Region". The control memory 38 contains a Free Region Queue indicated at 90 in FIG. 3. When the block 88 is activated, it causes the next entry in the Free Region Queue 90 to be selected. For example, when entry 1 in the Free Region Queue has been previously selected, entry 2 in the Free Region Queue 90 is now selected. This is indicated by broken lines 92 extending from the entry 2 in the Free Region Queue 90 to a table 94 in FIG. 3.

Entry 2 in the Free Region Queue contains a new region address in the host memory 38 and the length of such region. This information is transferred to the table 75 in place of the information previously recorded in the table. The blocks 78, 80, 82, 84, 86 and 88 are now operated as discussed above to transfer the payloads in the cells on the line 30 to the regions in the host memory 32. At the end of this region, entry 3 in the Free Region Queue may be selected to provide a new region address in the host memory 32 and the length of such region if the payload has not been completely recorded in the host memory 32. The steps described above are repeated in this manner until all of the payload has been recorded in the host memory 32.

Figure 4:
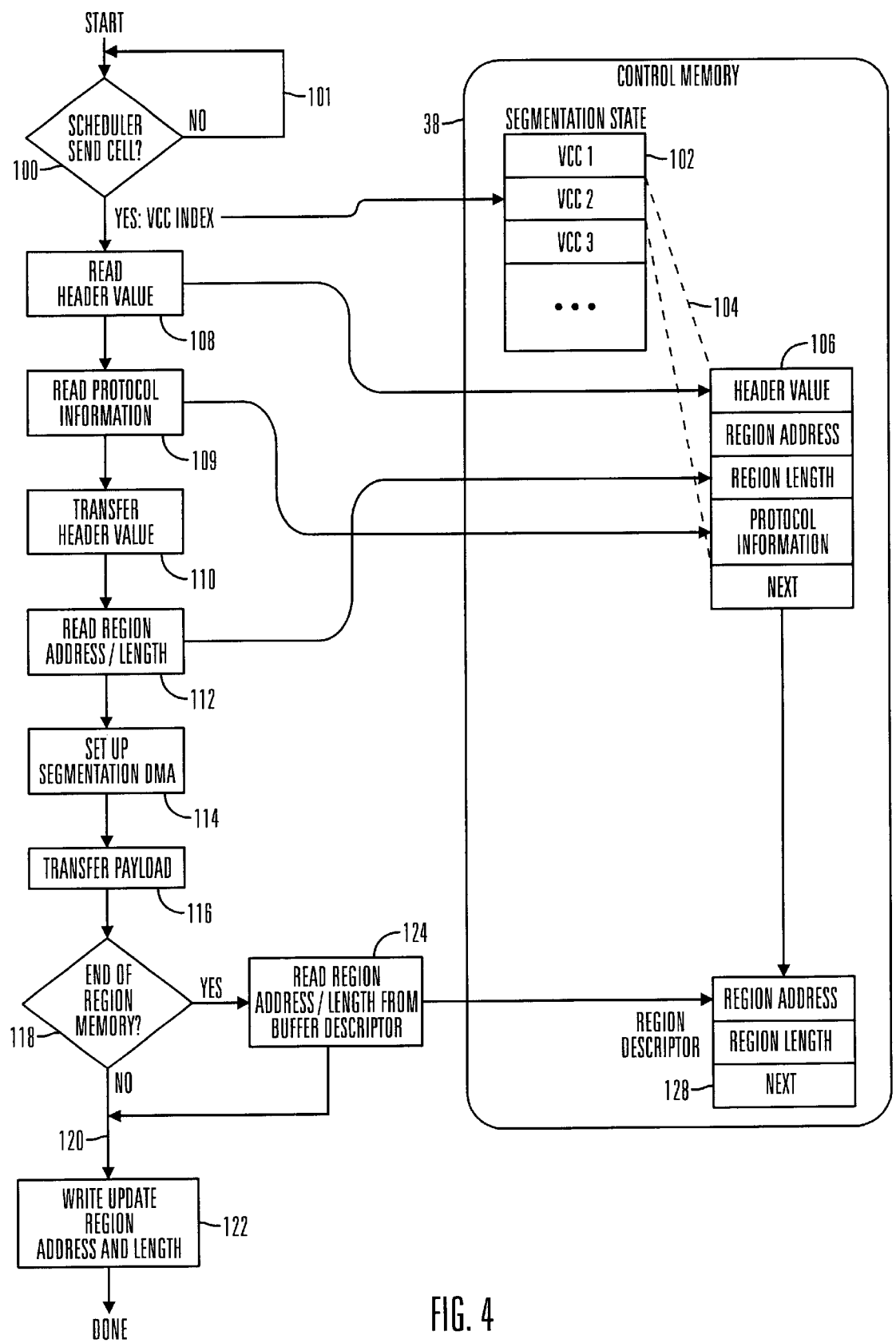
FIG. 4 is a schematic block diagram showing in additional detail the operation of the sub-system shown in FIG. 2 when the cell payloads are transferred from the host memory to the transmit cell interface.

FIG. 4 indicates in additional detail the operation of the sub-system shown in FIG. 2 in transferring the cell payloads from the host memory 32, reading the header from the control memory 38 to indicate the ATM path, combining the header and the payload into a cell and transferring the cell to the line 45 in FIG. 2. In the flow chart shown in FIG. 4, a block 100 is provided to determine if a VCC cell has been scheduled for a particular time slot by the scheduler 156 in FIG. 6. If a cell has not been scheduled, by the scheduler 156 in FIG. 6, no action is taken as indicated by a line 101 in FIG. 4.

If a cell has been scheduled for the particular time slot, the block 100 in FIG. 4 selects a virtual channel connection in a table 102 in the control memory 38. This table is designated as "Segmentation State" in FIG. 4. As shown in FIG. 4, the table 102 contains a plurality of virtual channel connections which are illustratively designated as "VCC 1", "VCC 2", "VCC 3", etc. The virtual channel connection VCC 2 is illustratively shown as being selected in the table 102. This is indicated by broken lines 104. It will be appreciated that any other block could have been chosen. The virtual channel connection VCC 2 illustratively includes a header value (to indicate the path of transfer of the cell), a region address, a region length, protocol information and the position of the next region in the host memory. This is illustrated at 106 in FIG. 2.

The header value and the protocol information in the VCC 2 block are read from the control memory 38 as indicated at 108 and 109 respectively in FIG. 4. The header value is then transferred to the transmit FIFO 48 in FIG. 2 as indicated at 110 in FIG. 4 and the region address and length are read from the VCC 2 virtual channel connection as indicated at 112 in FIG. 4. The segmentation DMA 46 in FIG. 2 is then set up (see block 114 in FIG. 4) and the payload is transferred from the host memory region to the transmit FIFO 48 in FIG. 2 (see block 116 in FIG. 4). A check is made in each transfer of the payload of a successive cell to determine if the region address being transferred for the virtual channel connection 106 is at the end of its length. This is indicated at 118 in FIG. 4.

If the end of the host region in the VCC 2 virtual channel connection has not been reached as indicated at 120 in FIG. 4, the region address at 106 in the control memory is incremented to account for the successive payload transferred to the transmit FIFO 48 and the region length is decremented by the same amount (see block 122). This provides an updated record of the region being processed in the virtual channel connection VCC 2 and an updated record of the remaining length of the region to be processed in the virtual channel connection VCC 2.

When the end of the region in the virtual channel connection VCC 2 has been reached, the address of the next region in the host memory 38 and the length of this region are read as indicated at 124. This next region is indicated as "Next" in the table 106 and is indicated in additional detail by a table 128 in FIG. 4. The table 128 is designated as a "Region Descriptor" to conform to the designation in the block 124. The table 128 also contains a block designated as "Next". The table 128 is then transferred to the position of the table 106 to replace the information previously in the table 106. The address information transferred from the table 128 to the table 106 is then processed in the blocks 108, 109, 110, 112, 114, 116, 118, 120, 122 and 124 in the same manner as described above. Upon the completion of the processing of the region in the table 106, the "Next" block in the table 106 is processed to determine the subsequent host region address in the host memory 32 and the length of this region address.

Figure 5:
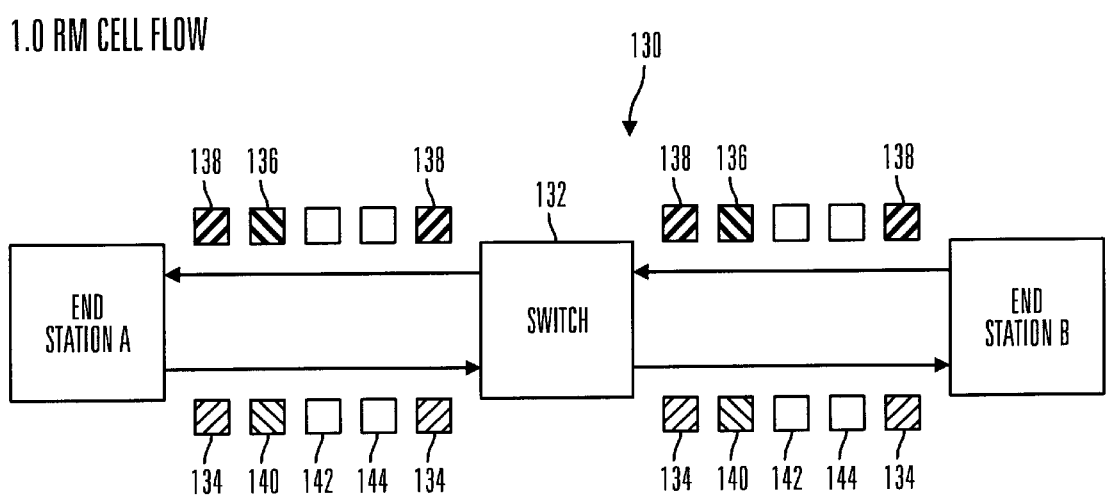
FIG. 5 is a schematic block diagram illustrating how different types of cells (data cells, forward resource management (RM) cells and backward resource management (RM) cells) are sent through a switch between a pair of stations A and B and also defining the different types of cells shown in the Figure.

FIG. 5 shows a system which is generally indicated at 130 and which is known in the prior art for passing different types of cells between stations A and B through a switch 132. Each of the stations sends three different types of information: (a) forward resource management (RM) cells, (b) backward resource management (RM) cells and (c) data cells. Generally thirty two (32) data cells are transmitted between stations A and B before a forward resource management (RM) cell is sent. Although only the switch 12 is shown as being connected between the stations A and B, it should be appreciated that any number of switches may be connected between the stations A and B without departing from the scope of the invention.

The resource management (RM) cells are provided to obtain a regulation of the rate at which the data cells are sent between the stations A and B. They provide rate information for controlling the production of the optimal, but not excessive, rate for the transmission of the data cells. If the rate of the data cell transmission is not at the maximum level at which the data cells can be sent, the system including the stations A and B will be underutilized. If the rate of the data cell transmission is too high, the system including the stations A and B will become congested and not all of the data cells will be able to pass through the system.

FIG. 5 illustrates at 134 forward RM cells transmitted in the transmit direction by the station A through the switch 132 to the station B. The transmit direction and the receive direction are relative to the station A. When received by the station B, the forward RM cells 134 become backward RM cells 136 in the station B. The backward RM cells are transmitted in the receive direction by the station B through the switch 132 to the station A. FIG. 5 also illustrates at 138 forward RM cells which are transmitted in the receive direction by the station B through the switch 132 to the station A. When received by the station A, these forward RM cells become backward RM cells 140 in the transmit direction from the station A to the station B. The backward RM cells 140 are then transmitted in the transmit direction from the station A through the switch 132 to the station B. FIG. 5 also indicates a pair of data cells 142 and 144 which are transmitted by the station A to the station B.

When the station A is transmitting cells in the transmit direction to the station B, the station A changes its rate depending upon the response of the station B and the response of the switch 132 in the receive direction from the station B to the station A. The reason is that the response in the receive direction from the station B to the station A is more up-to-date from a time standpoint (as far as the station A is concerned) than any response in the transmit direction from the station A to the station B.

There are certain protocols which are specified in the prior art to regulate the rate at which the station A transmits cells in the transmit direction to the station B. These will be discussed in some detail to provide a background for a full understanding of this invention. The allowable cell rate (ACR) of the cells transmitted from the station A to the station B through the switch B should be within the following limits:

MCR<ACR<PCR where

MCR=minimum cell rate and

PCR=peak cell rate.

In determining whether the cell rate in the transmit direction is proper to avoid congestion and to provide full system utilization, two (2) indications are provided. These indications are provided in the receive path from the station B to the station A because this is the shortest path to the station A. One is a congestion indication CI. When CI=1, a congestion is indicated in the transmit direction from the station A to the station B. When CI=0, no congestion is indicated in the transmit direction from the station A to the station B. The other indication is a no increase indication NI. NI=1 indicates no rate change. NI=0 indicates a rate increase. When CI=1, the actual cell rate is decreased by a fixed factor so that the allowable cell rate (ACR) is decreased to ACR—ACR·RDF where RDF is a fixed factor less than 1. When CI=0 and NI=1, there is no change in the allowable cell rate (ACR). When CI=0 and NI=0, the allowable cell rate (ACR) becomes ACR+ICR·RIF where RIF is a fixed factor less than 1 and ICR is the fixed initial cell rate.

In the prior art, an explicit rate is provided in a floating point format. As a result, a computation involving this floating point format is made every time that the allowable cell rate ACR is to be determined. This involves a loss of time and is quite complicated. Furthermore, the system requires vast changes if any of the equations have to be changed. The new value of the allowable cell rate (ACR) is obtained in the previous paragraph by selecting the lower of the explicit rate discussed in this paragraph and the allowable cell rate as determined in accordance with the previous paragraph.

There are certain rules which have been established in the prior art to provide priorities as to when a forward resource management (RM) cell, a backward RM cell and a data cell are to be sent. These rules are set forth in an article entitled "ATM Traffic Management Specification Version 4.0" published in April, 1996, by the ATM Forum and available through ftp:atmfosum.com/pub/approved-specs/af-tm-0056.000.ps. A number of these rules will be discussed in some detail in the immediately subsequent paragraphs to provide a background for a full understanding of this invention. These rules are set forth on pages 51–54 of the article specified above. This article is made of record to complete any additional background which may be considered to be important in providing a full understanding of this invention.

The rules providing a background to a full understanding of this invention include the following:

1. The value of the allowable cell rate (ACR) for the transmission of cells shall never exceed the peak cell rate (PCR) and shall never be less than the minimum cell rate (MCR). This has been discussed above. The source shall never send in-rate cells at a rate exceeding the allowable cell rate (ACR). The source may always send in-rate cells at a rate less than or equal to the allowable cell rate (ACR). "In-rate cells" are those that are at a rate less than or equal to the allowable cell rate (ACR) and that have cell loss priority (CLP) set to 0.

2. Before a source sends a first cell after a connection set-up to a source, the source shall set the allowable cell rate to at most an initial cell rate (ICR). The first in-rate cell shall be a forward resource management (RM) cell.

3. After the first in-rate forward RM cell has been transmitted, the next in-rate cell shall be a forward RM cell if, but only if, (a) Nrm-1 in-rate cells have been transmitted since the last transmission of the in-rate forward RM cell, where Nrm is 32 or (b) at least MRM cells (MRM being equal to 2) have been transmitted since the transmission of the last in-rate forward RN cell and the time since the transmission of the last forward RN cell is a fixed value such as a value greater than Trm where Trm is 100 milliseconds.

4. If the conditions specified in paragraph 3 are not met and if a backward RM cell from the station B is waiting for transmission by the station A and if no in-rate backward RM cell has been transmitted since the transmission of the last in-rate forward RM cell, a backward RM cell shall be transmitted.

5. The next in-rate cell transmitted shall be a backward resource management (RM) cell if the conditions specified in paragraphs 3 and 4 are not met and a backward RM cell from the station B is waiting for transmission by the station A and if no data cell is waiting for transmission.

6. The next in-rate cell transmitted by the station A shall be a data cell if none of the conditions specified in paragraphs (3), (4) and (5) is met and if a data cell is waiting for transmission.

7. Cells sent in accordance with paragraphs 1–5 shall have a cell loss priority (CLP)=0. A cell with a cell loss priority=0 is an in-rate cell.

8. Before sending an in-rate forward RM cell, if the allowable cell rate (ACR) is greater than the initial cell rate (ICR) and the time T elapsed since the sending of the last in-rate forward RM cell is greater than ADTF, then ACR shall be reduced to ICR before the station A transmits a forward in-rate RM cell in the transmit direction to the station B. The reason for this is to give the switch 12 an opportunity to receive cells from other paths. ADTF is a constant.

9. Before sending an in-rate forward RM cell and following the procedure specified in paragraph 8, if at least CRM in-rate forward RM cells have been sent since the last reception of a backward RM cell with BN=0, then the allowable cell rate ACR shall be reduced by at least ACR·CDF unless that reduction would result in a rate below the minimum cell rate MCR.

CRM is a constant for a particular connection and remains constant for the life of such connection. Each connection may have its own constant value for CRM. CDF is also a constant for a particular connection and remains constant for the life of that connection. Each connection may have its own constant for CDF. CDF has a value less than one (1).

BN is a field in each RM cell. The field can be set to BN=0 or BN=1. A switch such as the switch 132 can generate its own RM cell. The switch can do this when it is congested and an RM cell has not passed through the switch for a particular period of time.

The reason for reducing the cell rate as specified in this paragraph 9 is that the RM cell in the forward path from station A to station B may have a higher cell rate than that in the backward path from station B to station A. Because of this, the cell rate in the forward path from station A to station B is reduced.

10. After following the procedures set forth in paragraphs 8 and 9, the allowable cell rate (ACR) shall be placed in the CCR field of the outgoing forward RM cell. However, only in-rate cells sent after the outgoing forward RM cell have to follow the new rate.

11. Forward resource management (RM) cells (with a cell loss priority=1) may be sent out-of-rate—in other words, not actually conforming to the allowable cell rate (ACR). Out-of-rate forward RM cells shall not be sent at a rate greater than TCR. TCR may constitute a fixed rate of ten (10) cells/second. Cells with a cell loss priority (CLP)=1 are often called "tagged cells". A cell loss priority=1 is a particular bit in each ATM cell.

12. To restart cell transmission from station A to station B after the current cell rate becomes 0 or after the current cell rate is below the capability of the scheduler 156 in FIG. 6, an out-of-rate forward RM cell is sent with a cell loss priority=1. The station A continues to send the forward RM cells (with a cell loss priority=1) until it receives a backward RM cell with values of CI=0 and NI=0 and some value of explicit rate different from 0. When this occurs, the actual cell rate is the lower of the explicit rate and PCR·RIF. As discussed previously, PCR is the peak cell rate and RIF is a fixed factor less than 1.

13. Out-of-rate backward RM cells are provided because the forward RM cells and the backward RM cells can be provided at different rates, with the backward RM rate being relatively fast and the forward RM rate being relatively slow. If the station A receives a backward RM cell under these circumstances but has a new backward RM cell waiting to be sent to the station B, station A sends the new backward RM cell as an out-of-rate backward cell to the station B (with a cell loss priority= 1). There is no rate specification for the transmission of such out-of-rate backward RM cell from the station A to the station B because such transmission is triggered by the reception of a backward RM cell that is being sent to the station A at a rate that is excessive.

14. When the station A sends a forward RM cell to the station B, the switch(es) in the path in the receive direction from the station B to the station A can reduce the rate because of congestion in the switches. But the station B can also reduce the rate of such RM cells in turning around the forward RM cell from the station A and sending this RM cell as a backward RM cell to the station A. The reason for this is that the resources in the station B may be becoming crowded for whatever reasons including the fact that the station B may be receiving too many cells from a number of different sources including the station A.

15. An optional behavior may be provided to extend or modify the effects specified in paragraph 8. Instead of reducing the allowable cell rate (ACR) to the initial cell rate (ICR) as specified in paragraph 8, the allowable cell rate ACR may be reduced in progressive steps. Specifically, the allowable cell rate (ACR) may be reduced by a predetermined fixed factor not sufficient to reduce the allowable cell rate (ACR) to the initial cell rate (ICR). If the reduced cell rate is still too fast, the reduced cell rate is reduced by an additional fixed factor. This reduction may occur through several steps before the initial cell rate (ICR) is reached.

FIG. 6 is a schematic block diagram showing a system generally indicated at 148 for regulating the rate of cell transmission. FIG. 6 also includes a brief description of the cell information on the lines or buses between the different blocks in the Figure. The system 148 includes the control memory 38 also shown in FIG. 2, a block 150 designated as "Reassembly" and a block 152 designated as "Segmentation". The Reassembly block 150 may be considered to include the stages 34, 36, 40, and 42 in FIG. 2. The segmentation block 152 may be considered to include the stages 42, 46, 48 and 50 in FIG. 2.

FIG. 6 also includes a block 154 designated as an Available Bit Rate (ABR) Manager and a block 156 designated as a Scheduler. The Reassembly block 150 receives the cells on the line 30 (also shown in FIG. 2) from the receive cell interface. A bus or line 5a is connected to provide signals in both directions between the Reassembly block 150 and the control memory 38. A line or bus 8a provides signals in both directions between the control memory 38 and the segmentation block 152. The signals from the segmentation block 152 pass through the line 45 (also shown in FIG. 2) to the transmit cell interface.

Signals pass through a line 1a from the Reassembly block 150 to the ABR manager 154. A line 2a passes signals from the ABR manager 154 to the Scheduler 156 and a line 3a passes signals from the Scheduler 156 to the ABR manager 154. The Scheduler 156 passes signals through a line 4a to the segmentation block 152. Signals pass in both directions through a line or bus 7a between the Scheduler 156 and the control memory 38. Signals also pass in both directions through a line or bus 6a between the ABR manager 154 and the control memory 38.

The Reassembly block 150 provides a forward RM cell through the line or bus 5a to the control memory 38 and also identifies the particular VCC (or source) which is providing the data to be processed. The control memory 38 turns the forward RM cell around (in a manner which will be discussed in detail subsequently) so that the forward RM cell becomes a backward RM cell which is transmitted through the line 8a to the segmentation block 152.

The Scheduler 156 identifies the VCC (or the source) number providing the cell information to be processed. This VCC (or source) number is passed through the line 3a to the available bit rate (ABR) manager 154. The ABR manager 154 identifies the cell type (forward RM cell, backward RM cell and data cell) through the line 2a to the scheduler 156. The scheduler 156 provides through the line 4a to the segmentation block 152 the VCC (or the source) number and the cell type (data, in rate forward RM, in rate backward RM, out of rate forward RM and out of rate backward RM). The Scheduler 156 provides variable bit rate scheduling for data cells, in-rate forward RM cells and in-rate backward RM cells. The Scheduler 156 also provides TCR rate scheduling for tag cells at out-of-rate (very low rates) forward RM cells and queue based scheduling for out-of-rate backward RM cells.

Several different indications are provided from the Reassembly block 150 through the line 1a to the available bit rate (ABR) manager 154. The ABR manager 154 may receive through the line 1a a forward resource management (RM) cell and a VCC (or source) number. Alternatively, the ABR manager 154 may receive through the line 1a a backward RM cell and the VCC (or source) number. In this alternative, the ABR manager 154 may receive the explicit rate (ER), the congestion indication (CI), the no increase indication NI and the binary value of BN indicating whether or not a switch such as the switch 12 generate its own RM cell. All of these have been discussed in detail previously. Indications of the available bit rate (ABR) state and rate updates flow through the line 6a between the ABR manager 154 and the control memory 38.

Figure 7:
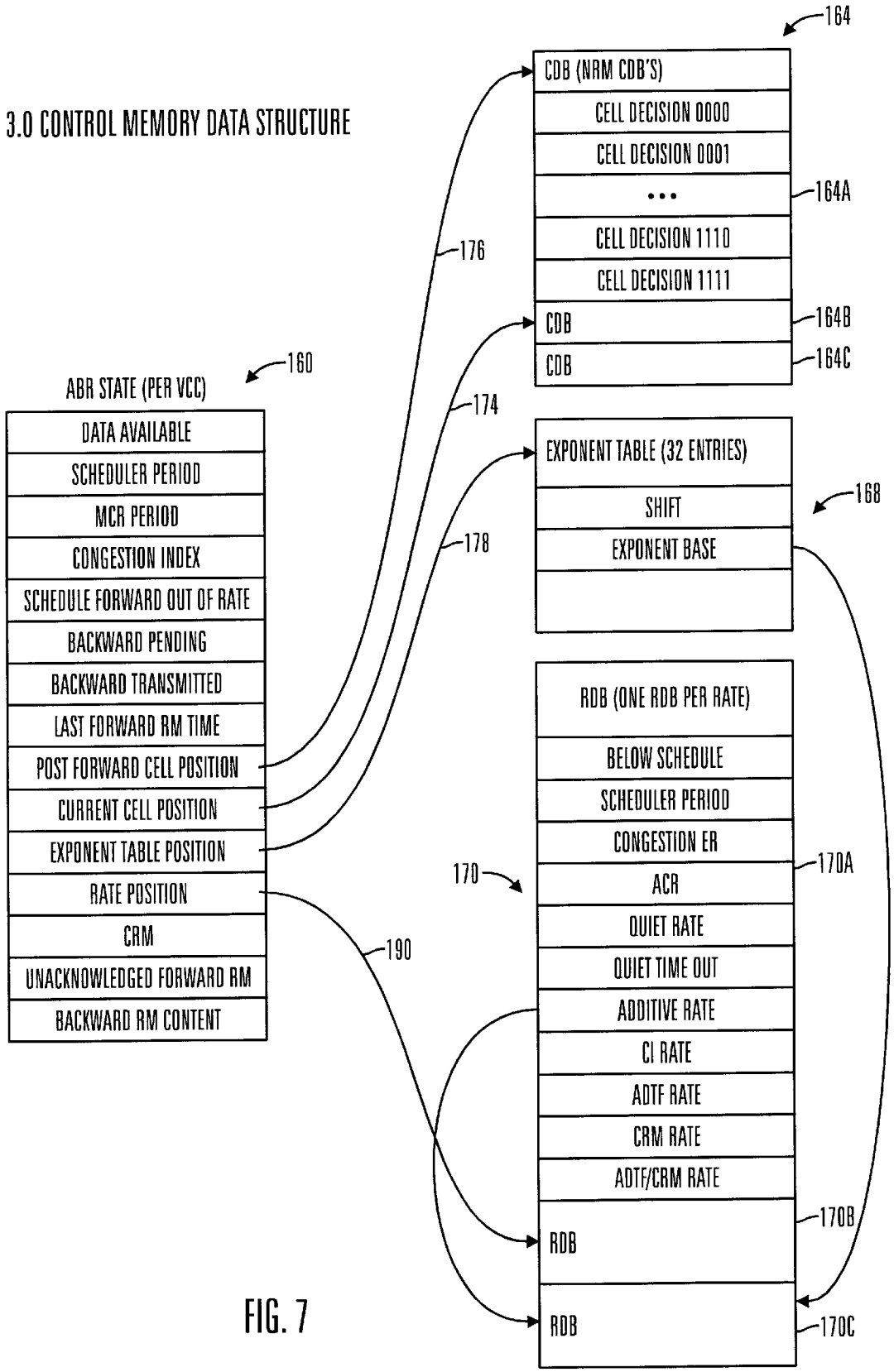
FIG. 7 is a schematic diagram illustrating the different features provided in a control memory included in the system shown in FIG. 5, these features including a number of fields in an Available Bit Rate (ABR) table, a number of fields in a plurality of Cell Decision Blocks (CDB), a plurality of fields in an Exponent Table and a plurality of fields in a plurality of Rate Decision Blocks (RDB), all provided to adjust the rate of cell transmission between the stations A and B to the optimal, but not excessive, rate.

FIG. 7 illustrates in additional detail what is stored in the control memory 38 at the station A. What is shown in FIG. 7 for the station A is duplicated at the station B. FIG. 7 includes a table which is generally indicated at 160 and which provides the values of a plurality of parameters in a plurality of different fields. This table is designated as ABR State (per VCC). This table indicates the values of a number of different parameters which are provided in different fields in the ABR State table 160 and which are individually used to facilitate the operation of the system and method of this invention. Definitions of the different parameters specified in the different fields in the ABR State table 160 in FIG. 7 are set forth in the table generally indicated at 163 in FIG. 8. A number of these definitions will be supplemented in the subsequent discussion. FIG. 8 is designated as "ABR State Fields".

FIG. 7 also shows a plurality of cell decision blocks which are generally indicated at 164 and which are stored in the control memory 38. Three (3) blocks 164a, 164b and 164c are shown in a vertical column in FIG. 7 but they are representative of a number of cell decision blocks greater than three (3). As will be discussed in detail subsequently, each of the cell decision blocks 164a, 164b and 166c provides an indication of whether the cell in that block is a forward resource management (RM) cell, a backward RM cell or a data cell.

The cell decision blocks 164a, 164b and 164c are activated in sequence. However, whenever either of the blocks 164 or 164c indicates a forward RM cell, the next cell decision block activated in the sequence is the block 164a. Although the blocks 164b and 164c are not shown in the same detail as the block 164a, it should be appreciated that the blocks 164b and 164c have the same parameters for the different fields in such blocks as those shown in the block 164a. As shown in FIG. 7, the cell decision block 164a provides sixteen (16) different combinations of four (4) binary bits. FIG. 9 provides a table, generally indicated at 166, indicating the significance of each individual one of the four (4) binary bits. The table in FIG. 9 is designated as Cell Decision Block (CDB) Fields.

FIG. 7 also shows an exponent table generally indicated at 168. The exponent table 168 is stored in the control memory 38. The exponent table 168 has thirty two (32) entries corresponding to the thirty two (32) different values represented by an exponent with five (5) binary bits. FIG. 7 also shows a plurality of rate decision blocks which are generally indicated at 170 and which are stored in the control memory 38. Three blocks 170a, 170b and 170c are shown in a vertical column in FIG. 7 but they are representative of a number of rate decision blocks significantly greater than three (3). As will be discussed in detail subsequently, each of the rate decision blocks 170a, 170b and 170c provides an indication of an individual rate at which cells are to be transmitted from the station A through the switch 12 to the station B. Although the blocks 170b and 170c are not shown in the same detail as the block 170a, it should be appreciated that they have the same parameters for the different fields as those shown in the block 170a. FIG. 10 provides a table generally indicated at 172 and providing definitions of the various parameters in the different fields in each of the rate decision blocks 170. The table in FIG. 10 is designated as Rate Decision Block (RDB) Fields.

The "Data Available" field in the ABR State table 160 indicates that data for a data cell is available to be processed. The "Scheduler period" field indicates the time between successive in-rate cells in the individual one of the rate decision blocks 170 selected at any instant. The "MCR" field indicates the maximum time between successive in-rate cells before a minimum cell rate (MCR) increase is provided. If the cell rate between successive in-rate cells decreases below the minimum cell rate, the priority of that connection increases so that the in-rate cell rate becomes at least equal to the minimum cell rate.

The "Congestion Index" field in the ABR State table 160 in FIG. 7 identifies a particular VCC with a particular resource which is exterior to the system at the station A. The particular resource may provide for the storage of data. The "Schedule Forward Out of Rate" field provides for the "Below Schedule" field in each of the rate decision blocks 170 to send out-of-rate forward RM cells to restart the VCC (or source) connection. The "Backward Pending" field in the ABR State table 160 indicates that there is a backward RM cell pending at the station A at the time that the station A is ready to transmit an in-rate cell.

The "Backward Transmitted" field in the ABR State table 160 in FIG. 7 indicates that a backward RM cell has been transmitted by the station A since the last time that the station A has transmitted a forward RM cell. The "Last Forward RM Time" field indicates the time of the last in-rate transmission of an in-rate forward RM cell. The "Current Cell Position" field indicates the individual one of the current cell decision blocks 164 being processed at each instant after each of the cell decision blocks 164a, 164b and 164c is processed to determine the cell type (data, forward RM or backward RM) in that block, the next one of th cell decision blocks in the downward direction is processed. However, when a forward RM cell is processed in a cell decision block to determine the cell type in that block, the cell decision block 164a is the next to be selected.

As will be seen, a vector 174 extends from the "Current Cell Position" field in the ABR State table 160 in FIG. 7 to an individual one of the cell decision blocks 164 to indicate the individual one of the cell decision blocks selected for processing at any instant. The "Post Forward Cell Position" field in the ABR State table 160 indicates the selection of the cell decision block 164a after a forward RM cell has been transmitted by the station A. A vector 176 extends from the "Post Forward Cell Position" to the cell decision block 164a to indicate the selection of the cell decision block 164a under such circumstances.

The "Exponent Table Position" field in the ABR State table 160 in FIG. 7 indicates the location of the thirty two (32) entries in the Exponent Table 168. A vector 178 points to the first entry in the exponent table 168. The exponent table is used to map between the explicit rate as indicated in a floating point representation and a rate in a selected one of the rate decision blocks 170. The floating point representation may illustratively be indicated as $$2^{exp} (1+\text{mantissa}) \text{ nz cells/second}$$

where nz=non-zero=1 bit (rate is non-zero);

exponent=5 bits; and mantissa=9 bits

Each of the rate decision blocks 170 requires 32 bytes of memory. Because of this, it is not practical to have an explicit rate decision block for each possible value of the floating point representation, particularly since there are $2^{14}+1$ different possible numbers in the floating point representation. The exponent table 168 in FIG. 7 accordingly reduces the number of rate indices in converting from the floating point representation to the explicit rate.

The exponent table 168 includes a shift and an exponent base. The exponent base in the exponent table 168 indicates the particular one of the rate decision blocks 170 that would be selected if the mantissa had a value of zero (0). The shift in the exponent table 168 indicates the number of binary bits (out of a total of 9 bits indicating the value of the mantissa) that the mantissa is shifted. The values of the mantissa and the exponent are stored in a field for each resource management (RM) cell.

The exponent table 168 contains an entry for each, value of the exponent. Since the exponent is indicated by five (5) binary bits as specified above, there are thirty two (32) entries for the exponent. Each entry may have more than one (1) rate index depending upon the value of the shift associated with such entry. For example, when the mantissa is shifted by 9 bits corresponding to a shift=9, there is only one (1) rate index for the exponent entry. However, when the mantissa is not shifted, thereby providing a shift=0 for an exponent entry, the number of rate indices for the exponent entry is 512 corresponding to a mantissa value of $2^9=512$.

A shift=9 is generally provided at the extremes of the exponent entry range of 0 through 31. This results from the fact that, from a statistical standpoint, values of rate indices at the extremes of the range of exponent entries occur only infrequently or not at all. Examples of extremes in the exponent entry are exponent entries of 0 and 31. For example, these extremes are generally beyond the range selected by the Scheduler 156 in FIG. 6. Because of this, coarse indications of rate indices are acceptable in these extremes of the exponent entry range. However, for exponent entries such as 15 or 16 in the middle of the exponent entry range, values of shift=0 may be selected. For a shift=0 for an exponent entry such as 15 or 16, 512 different explicit rate decision blocks may be provided. Since a considerable number of rate indices are provided for exponent entries such as 15 or 16, a fine control is provided in the selection of the rate index for such exponent entries.

The exponent entry may be considered to provide a coarse control in the selection of the particular one of the rate decision blocks (RDB) 170. For example, the exponent entry may be considered to indicate values in the 10's, 100's, 1000's, etc. The mantissa may be considered to provide a fine control in the selection of the particular one of the rate decision blocks (RDB) 170. For example, a simplified value of 260 for the floating point representation may be represented as 2.6×100 where 2.6=the mantissa and 100=the exponent entry.

Figure 11:
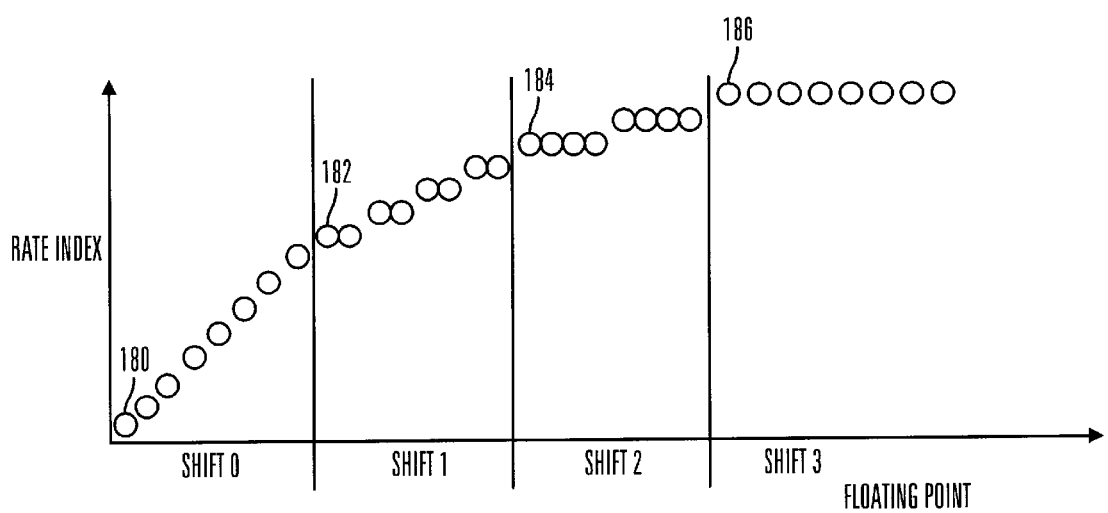
FIG. 11 is a curve schematically showing how shifted values of a mantissa affect the value of an explicit rate used in selecting one of the Rate Decision Blocks shown in FIG. 7 to provide the optimal, but not excessive, rate of cell transmission between the stations A and B.

FIG. 11 illustrates on a simplified schematic basis how the rate indices provided by the rate decision blocks 170 are selected in the exponent table 168 for different values of the exponent entry. To provide a simplified explanation, the curve shown in FIG. 11 is illustratively for a mantissa of three (3) binary bits rather than for the nine (9) binary bits discussed above for the mantissa. Because of this, only a maximum of eight (8) rate indices can be provided in FIG. 11 for an exponent entry. In FIG. 11, progressive shifts of shift=0, shift=1, shift=2 and shift=3 are provided along the horizontal axis. Individual values of the rate index are shown along the vertical axis.

As will be seen, eight (8) different rate indices are provided in FIG. 11 for a shift=0. The exponent entry for a shift=0 is indicated at 180 in FIG. 11. Progressively increased values from the rate index 180 are shown for progressive values of the mantissa between 0 and 7 respectively corresponding to the different binary values represented by the three (3) binary mantissa bits. For a shift=1, the exponent value is indicated at 182. Four (4) progressive values of the rate index corresponding to four (4) possible different values are shown in FIG. 11 for the two (2) binary bits representing the shifted value of the mantissa when shift=1.

In like manner, for a shift=2, the value of the exponent entry is indicated at 184. Two (2) progressive values of the rate index are provided corresponding to two (2) possible different values for the single binary bit representing the shifted value of the mantissa when shift=2. For a shift=3, only one exponent value 186 is provided to indicate the rate index. This is the only rate index that is provided under such circumstances. Thus, as will be seen, an increasing density of the explicit rates for an exponent is provided with decreasing values of the shift entries.

The "Rate Position" field in the ABR State table 160 in FIG. 7 indicates the current one of the rate decision blocks 170 that has been selected. A vector 190 extends from the "Rate Position" field to an individual one of the Rate Decision Blocks 170 to indicate the current one of the rate decision blocks that has been selected. The "CRM" field in the ABR State table 160 indicates a constant value for a particular connection. The constant value provided by CRM is indicated in paragraph 9 above. The "Backward RM content" field in the ABR State table 160 in FIG. 7 is provided to generate a backward RM in the transmit direction cell from the station A to the station B.

As previously described, each of the cell decision blocks 164 in FIG. 7 includes four (4) binary bits capable of providing sixteen (16) different combinations. Some of these combinations are shown in FIG. 7 for the cell decision block 164a. The table 166 in FIG. 9 indicates the significance of each of the four (4) binary bits. As shown in the table 166 in FIG. 9, the first binary bit (bit 0) indicates whether data is available. The second binary bit (bit 1) indicates whether a backward RM cell has been transmitted in the transmit direction from the station A to the station B since the last transmission of a forward RM cell in the transmit direction from the station A to the station B. The third binary bit (bit 2) indicates whether a pending backward RM cell is available to be transmitted in the transmit direction from the station A to the station B. The fourth binary bit (bit 3) indicates whether the time since the last transmission of a forward RM cell in the transmit direction from the station A to the station B is greater than a constant Trm. The constant Trm indicates the upper boundary of the allowable frame time during which a forward RM cell is not sent in the transmit direction from the station A to the station B.

Parameters in a number of different fields are shown in the Rate Decision Block 170a in FIG. 7. It should be appreciated that the same fields appear in each of the other Rate Decision Blocks 170 in FIG. 7. Definitions of these parameters are provided in the table 172 in FIG. 10. These definitions are supplemented in the following discussion. The "Below Schedule" field in the rate decision block 170a in FIG. 7 indicates that the allowable cell rate (ACR) is zero (0) or is at least below what the scheduler 156 in FIG. 6 can handle. In this connection, reference is made to the "Schedule Forward Out of Rate" field in the ABR State table 160. This provides for the "Below Schedule" field in each of the rate decision blocks 170 to send out-of-rate forward RM cells to restart the connection.

The "Scheduler Period" field in the rate decision block 170a in FIG. 7 is the period provided by the Scheduler 156 in FIG. 6 between successive in-rate cells. The "Congestion ER" field is a congested explicit rate. The explicit rate is formed from values of an exponent and a mantissa. The explicit rate is a field in a forward RM cell and a backward RM cell. "Congestion ER" is the new value of the explicit rate for the backward RM cell in the transmit direction from the station A to the station B when there is congestion in the station A as indicated by the "Congestion Index" field in the ABR state table 160.

The "ACR" field in the rate decision block 170a in FIG. 7 indicates the allowable cell rate in the floating point format involving the exponent and the mantissa. It is used for generating forward RM cells in the transmit direction from the station A to the station B. The "Quiet Time Out" field indicates a "time out" value stored for each rate decision and is a function of the current rate. A "time out" occurs when a forward RM cell has not passed from the station A to the station B for a particular period of time. This "time out" is used in providing the optional behavior specified above in paragraph 15.

Each individual one of the rate decision blocks 170 stores the identity of a new rate decision block which is to be selected when there is an inability to accommodate the current cell rate specified in such individual one of the rate decision blocks. The new rate decision block is selected when the period specified in the Quiet Time Out field in the individual one of the rate decision blocks 170 is exceeded. The rate decision block provides a new value for the Rate Position field in the ABR state table. The new value in the Rate Position field is specified as "Quiet Rate" in the table 172 in FIG. 9. The Quiet Rate field points from the current one of the rate decision blocks 170 to the new one of the rate decision blocks to obtain a new current cell rate at a reduced value when a Quiet Time Out occurs.

The values in the Additive Rate field, the CI Rate field, the ADTF Rate field, the CRM Rate field and the ADTF/CRM Rate field in the table 172 in FIG. 10 are like the value in the Quiet Rate field in storing a new cell rate in the current one of the rate decision blocks 170. This new cell rate is selected when it is determined that the cell rate provided by the current one of the rate decision blocks produces a congestion. The current one of the rate decision blocks stores a new value for the Rate Position field for each individual one of the Additive Rate field, the CI Rate field, the ADTF Rate field, the CRM Rate field and the ADTF/CRM Rate field. In other words, the value provided in the Rate Position field of the current one of the rate decision blocks 170 may be different for each individual one of the values in the Quiet Rate field, the Additive Rate field, the CI Rate field, the ADTF Rate field, the CRM Rate field and the ADTF/CRM Rate field in the table 172 in FIG. 10.

The CI Rate field in the current one of the Rate Decision Blocks (RDB) in FIG. 7 indicates the new rate decision block which is to be selected when the congestion indication CI=1. This is instead of calculating ACR-ACR.RDF. This calculation has been indicated in the protocol discussion almost immediately prior to the numbered paragraphs. The ADTF Rate field in the current one of the rate decision blocks (RDB) 170 in FIG. 7 indicates the new rate decision block to be selected to avoid the calculation specified above in 8. It indicates the new rate decision block when a forward RM cell is about to be transmitted by the station A in the transmit direction to the station B and the time since the transmission of the last forward RM by the station A is greater than the fixed constant ADTF.

The CRM Rate field in the current one of the rate decision blocks 170 in FIG. 7 indicates the new rate decision block to be selected. It avoids the calculation specified above in paragraph 9. It indicates the new rate decision block when the count of the forward RM cells in the transmit direction from the station A since the reception at the station A of last backward RM cell with BN=0 is at least the fixed value CRM. The ADTF/CRM Rate field in the current one of the rate decision blocks 170 in FIG. 7 indicates the new rate decision block to be selected when the conditions specified immediately above for the ADTF Rate and the CRM Rate have been simultaneously met. It indicates a new value for the Rate Position field in the ABR state table 160 in FIG. 7 when a forward RM cell is about to be transmitted and the value in the Unacknowledged Forward RM field in the table 160 is equal to or greater than CRM and the time since the last transmission of a forward RM cell in the transmit direction is greater than the fixed value ADTF.

Figure 12A:
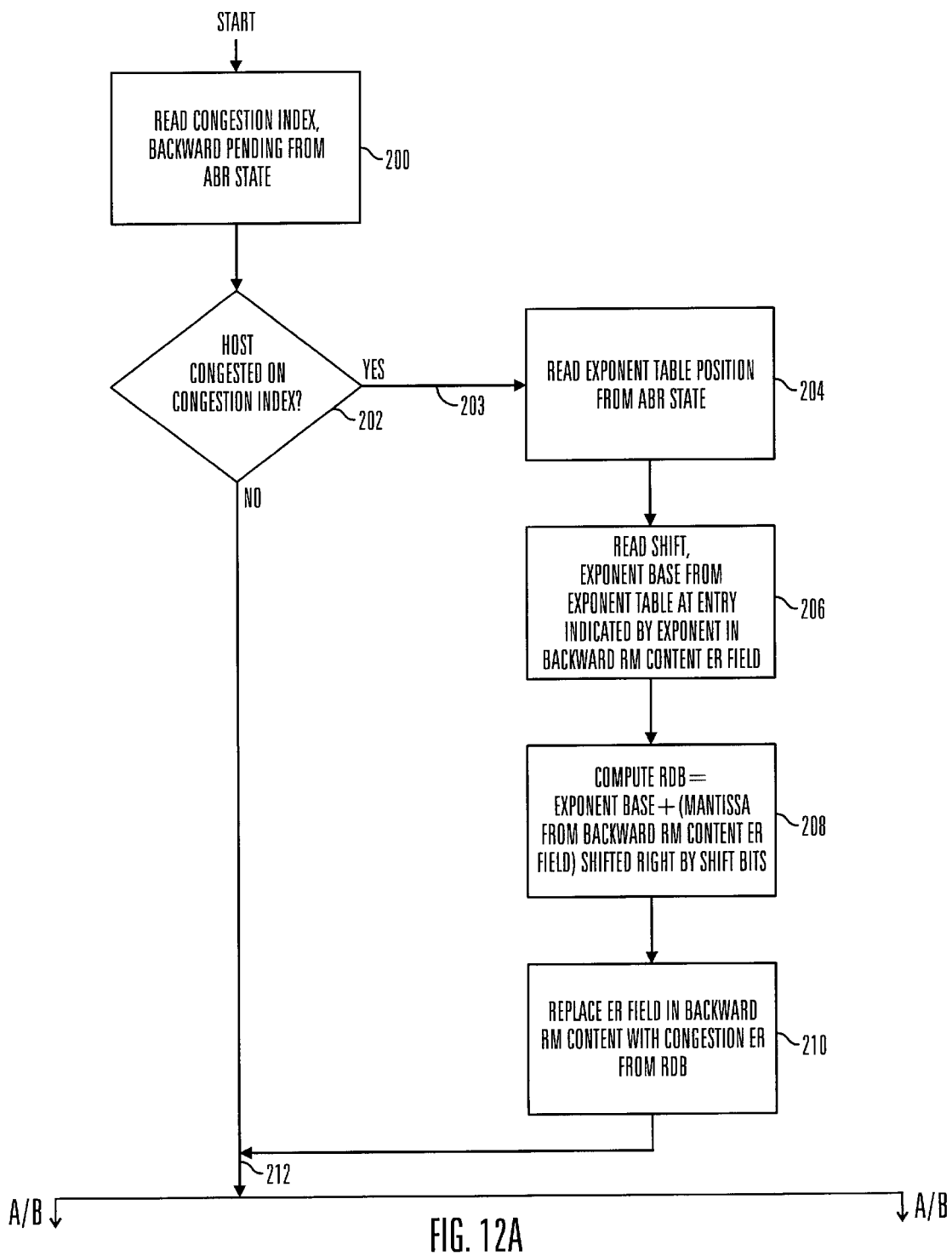
FIGS. 12a, 12b, 13a, 13b and 14a–14d show schematic flow charts indicating how the system shown in FIG. 6 operates to provide the optimal, but not excessive, rates of cell transmission when different sets of parameters occur in the different fields shown in FIG. 7.
Figure 12B:
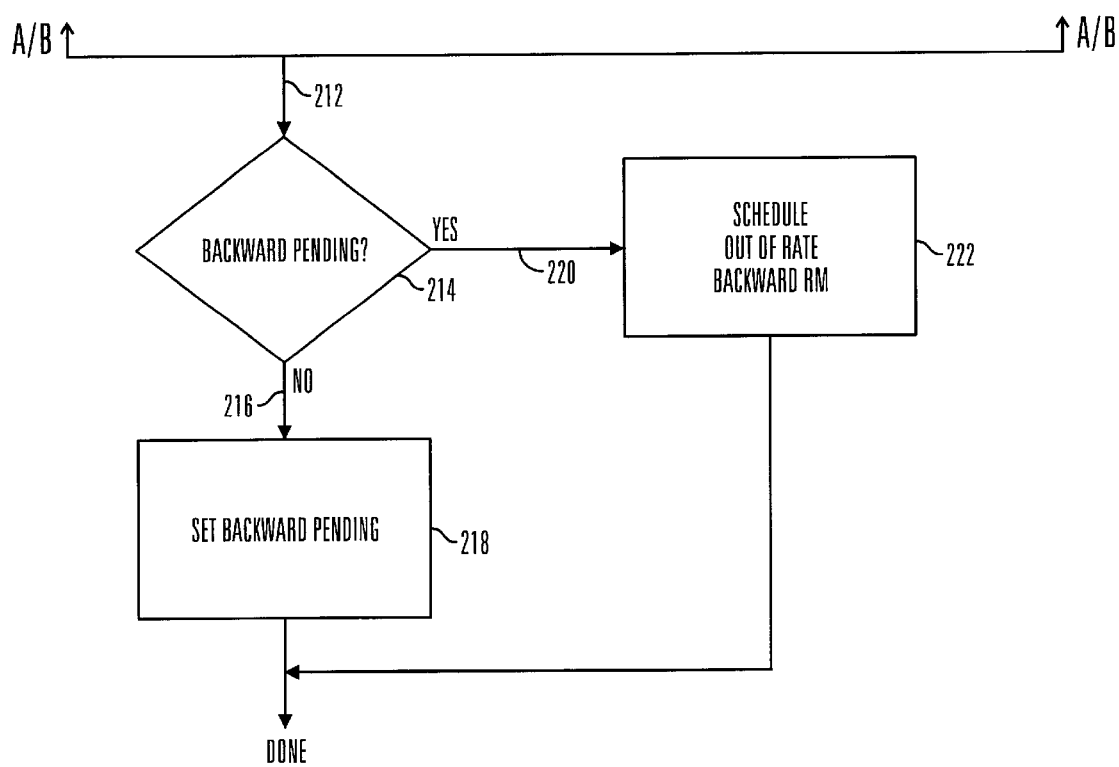

FIGS. 12a, 12b, 13a, 13b, 14a, 14b, 14c and 14d constitute flow diagrams showing successive steps in the operation of the system discussed above. These flow diagrams indicate the successive steps taken by the ABR Manager 154 in FIG. 6 to process information received by the station A from the station B. In FIGS. 12a and 12b, the information processed by the ABR Manager 154 is introduced to the control memory 38 in FIG. 6 in the receive path from the station B to the station A. The control memory 38 holds this information so that it can be used by the station A to transmit cells in the transmit direction from the station A to the station B. The steps shown in FIGS. 12a and 12b are taken when a forward RM cell is processed by the Reassembly stage 150 and the result of the processing is indicated to the ABR manager 154 through the line 1a.

A block 200 in FIG. 12a indicates that the Congestion Index and Backward Pending fields are read from the ABR State table 160 in FIG. 7. The Congestion Index field identifies a particular resource which is exterior to the system at the station A. The Backward Pending field indicates that the station A has received a forward RM cell that has not yet been transmitted as a backward RM cell.

A block 202 in FIG. 12a indicates whether there is a congestion on the basis of the indications from the block 200. If there is a congestion as indicated on a line 203, the Exponent Table Position field in the ABR State table 160 in FIG. 7 is read as indicated by the block 204 in FIG. 12a. The Exponent Table Position field indicates the first one of the thirty two (32) entries in the Exponent Table 168 in FIG. 7. As will be seen, the Exponent Table 168 in FIG. 7 has designations of Shift and Exponent Base. The Exponent Base field indicates the individual one of the rate decision blocks 170 that would be selected if the mantissa had a value of zero (0). The Shift field indicates the number of binary bits through which the mantissa is shifted. The Shift and Exponent Base fields in the Exponent Table 168 indicated by the exponent of the ER field in the received backward RM cell are also read as indicated in a block 206 in FIG. 12a.

A block 208 in FIG. 12a indicates how the new one of the Rate Decision Blocks 170 is selected to alleviate the congestion indication on the line 203. The value of the mantissa is stored in an explicit rate field in the backward RM cell. The new one of the rate decision blocks 170 is computed from this value of the mantissa and from the Exponent Base and Shift values in the Exponent Table 168. The Congestion Explicit Rate from the new one of the rate decision blocks 170 is then read. This Congestion Explicit Rate is the new cell rate to be provided in the system to avoid congestion. This Congestion Explicit Rate replaces the previous Congestion Explicit Rate in the backward RM cell. This is indicated at 210 in FIG. 12a.

The output indications from the block 210 and the block 202 are introduced to a line 212 at the bottom of FIG. 12a and the top of FIG. 12b. A determination is then made as at 214 in FIG. 12b as to whether there is a backward pending RM cell in the transmit direction from the station A to the station B and there is another (a current) backward pending RM cell coming to the station A. A backward pending RM cell and a current backward pending RM cell may occur because there may be more backward RM cells in the receive direction from the station B to the station A than forward RM cells in the direction from the station A to the station B. This may result from the congestion in the switch 12 which receives cells from other stations in addition to the cells from the station B. As will be appreciated, if there is more than one (1) switch between the stations B and A in the receive direction, the congestion discussed in this paragraph may occur at any of these switches.

When it is determined that there is a backward pending RM cell in the transmit direction and there is not another backward pending RM cell coming to the station A in the receive direction, a signal is produced as at 216 in FIG. 12b. The background pending RM cell is then transmitted as an in-rate backward pending RM cell in the transmit direction from the station A to the station B as indicated at 218. However, when it is determined that there is a backward pending RM cell in the transmit direction and there is another (a current) backward pending RM cell coming to the station A in the receive direction, a signal is produced on a line 220. This causes an instruction to be provided to the Scheduler 156 in FIG. 6 to send the current backward RM cell as an out-of-rate backward pending RM cell in the transmit direction from the station A to the station 13. This is indicated at 222 in FIG. 12b.

Figure 13A:
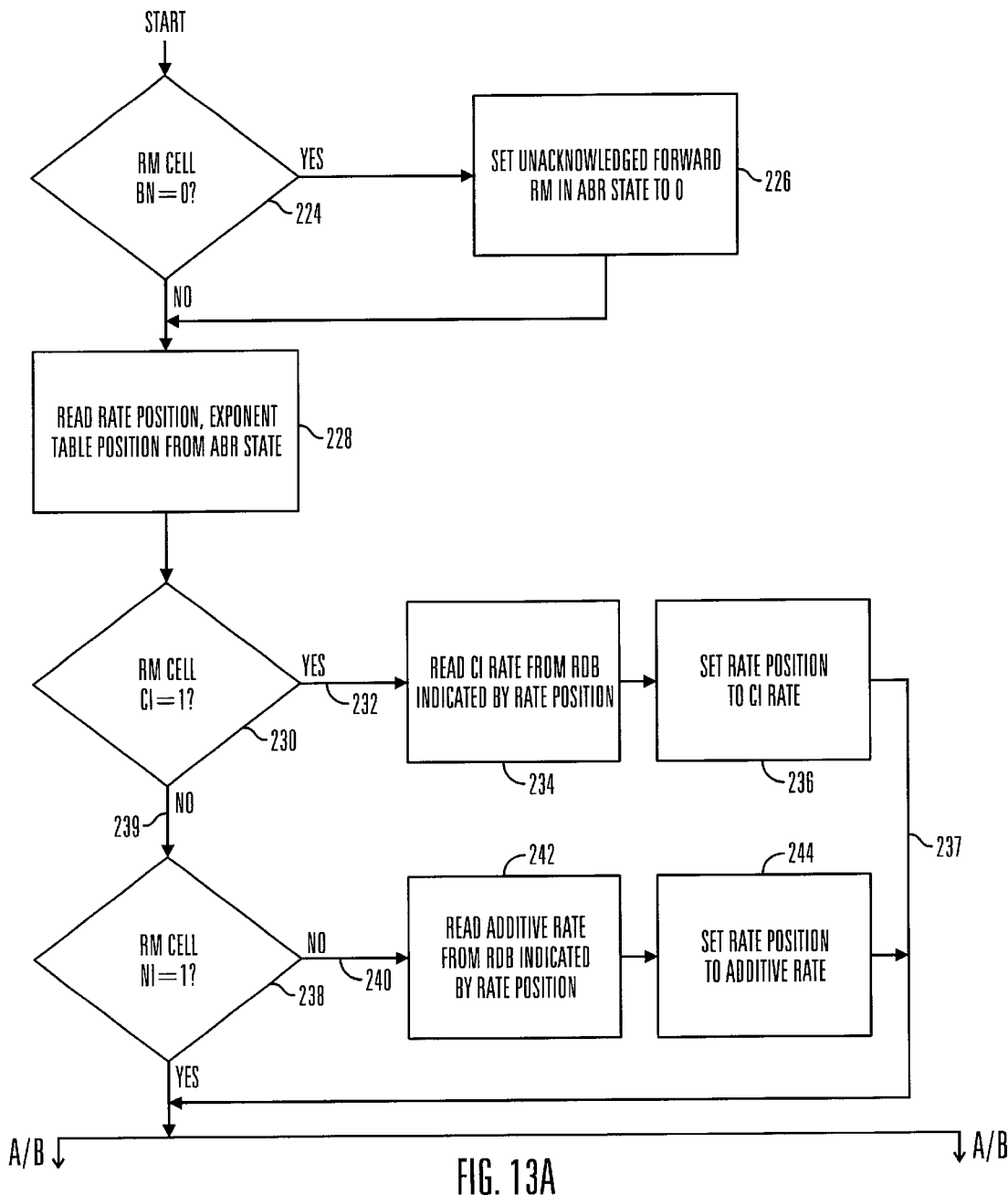

FIGS. 13a and 13 indicate steps that are taken to adjust the operation of the ABR Manager 154 in FIG. 6 in response to a backward RM cell indication on the line 1a. They indicate signals which are introduced to the ABR Manager 154 without passing through the control memory 38. The signals do not have to pass through the control memory 38 because there is no turn around of these signals through the control memory 38. This turn-around in the control memory 38 illustratively occurs when forward RM cells are received in the receive direction at the station A and the station A then transmits these cells as backward RM cells in the transmit direction from the station A to the station B.

Figure 13B:
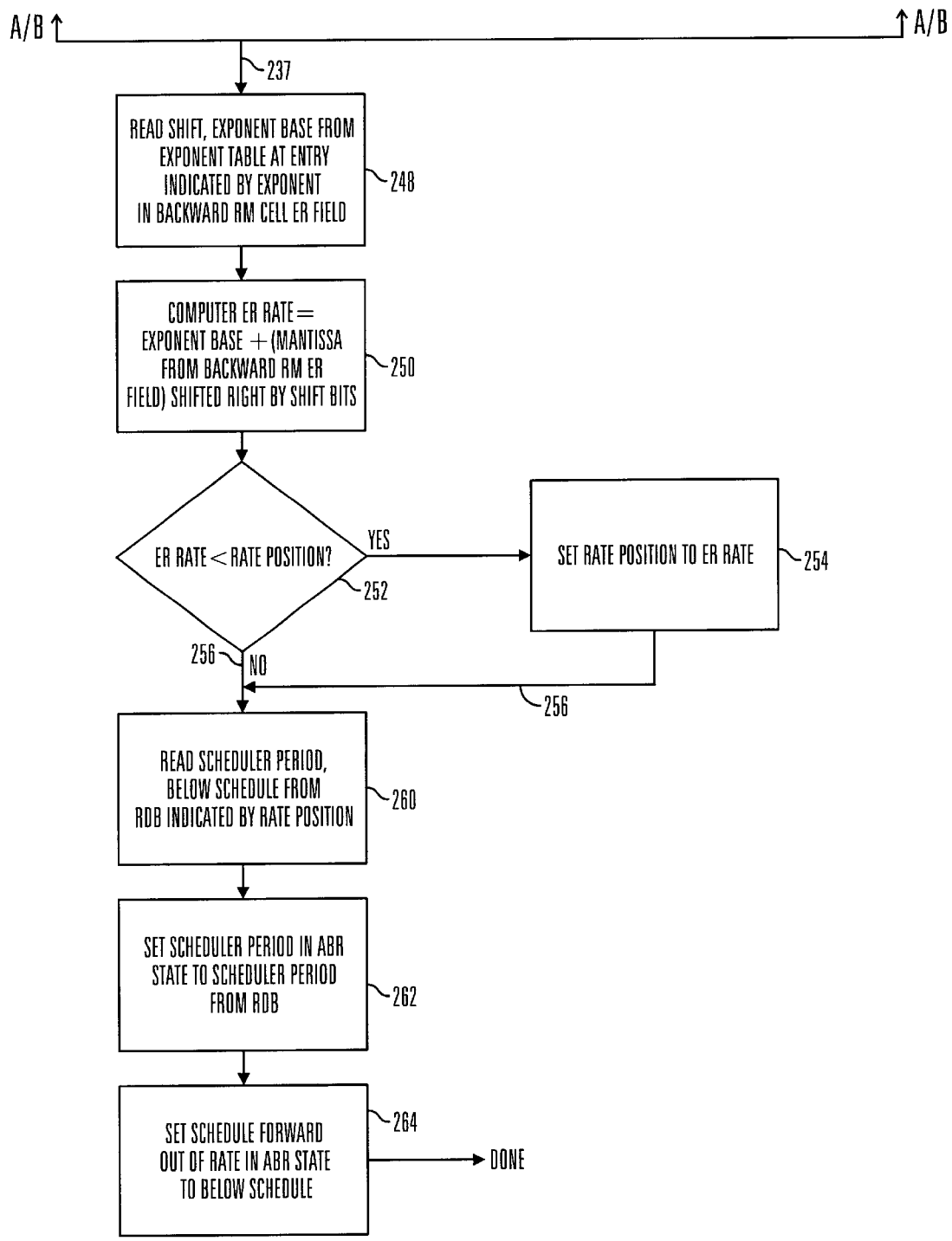

As a first step in the flow diagram shown in FIGS. 13a and 13b, a backward RM cell is received at 224. A determination is then made at 224 whether BN=0 for this backward RM cell. When BN=0, the backward RM cell was not generated in the switch 12. When BN=0, the backward RM cell is a normal backward RM cell so that the count of the Unacknowledged Forward RM cells in the ABR State table 160 in FIG. 7 is set to zero (0) as indicated at 226. The unacknowledged Forward RM field indicates the number of the Forward RM cells transmitted from the station A to the station B since the last normal backward RM cell was received at the station A.

When BN=1, a backward RM cell was generated in the switch 12. This switch generated RM cell does not affect the unacknowledged Forward RM value. The Rate Position field in the ABR State table 160 is read as at 228 to indicate the new one of the rate decision blocks 170 that is provided to indicate a new cell rate. At the same time, the Exponent Table Position field in the ABR State table 160 in FIG. 7 is read to indicate the first one of the thirty two (32) entries in the Exponent Table 168. A determination is then made as at 230 as to whether the Congestion Indication (CI) in the RM cells is a binary 1.

If CI=a binary 1 as indicated on the line 232, the CI rate is read from the current one of the rate decision blocks 170 as indicated by the Rate Position field in the ABR State table 160 in FIG. 7. This is indicated at 234 in FIG. 13a. The Rate Position field in the ABR State table 160 is then set to the rate read in the CI Rate field from the current one of the Rate Decision Blocks 170 as indicated as 236 and the new one of the Rate Decision Blocks 170 is selected from the new value set in this Rate Position field. This is indicated at 237 in FIG. 13a.

If CI=0 in the RM cell, a signal is produced on a line 239. A determination is then made as at 238 as to whether NI=1. When NI=0, a rate increase is indicated. This is indicated by a signal on a line 240 in FIG. 13a. The rate in the Additive Rate field is then read from the current one of the Rate Decision Blocks 170 as indicated by the Rate Position field in the ABR State table in FIG. 7. This is indicated at 242. The Rate Position in the ABR State table 160 is then set to the rate read from the Additive Rate field in the current one of the Rate Decision Blocks 170 as indicated at 244 and the new one of the Rate Decision Blocks 170 is selected from the new value set in this Rate Position field. This is indicated on the line 237.

The line 237 is also shown in FIG. 13b as being introduced to a block 248. The values of the exponent base (a rate decision block selected without considering the effect, of the mantissa) and the shift (the number of binary bits that the mantissa is shifted) are then read from the entry selected in the exponent table 168 in FIG. 7 by the exponent of the explicit rate field of the backward RM cell. The mantissa is also read from the explicit rate field in the backward RM cell passing in the receive direction from the station B to the station A.

The rate index corresponding to the backward RM cell explicit rate is computed from the parameters specified in the previous paragraph. This is indicated at 250 in FIG. 13b. As indicated at 252 in FIG. 13b, a determination is then made as to whether the explicit rate is less than the rate in the new rate decision block indicated at the Rate Position field in the ABR State table 160 in FIG. 7. If the explicit rate is less than the rate in the new one of the rate decision blocks 170 indicated in the Rate Position field in the ABR State table 160, the Rate Position is set to the explicit rate. This is indicated at 254 in FIG. 13*b*.

A line 256 from the block 254 indicates that the explicit rate is not now less than the rate indicated in the Rate Position field in the ABR State table 160 in FIG. 7. This results from the adjustment provided in the block 254. The line 256 also extends from the block 252 to provide an indication that the explicit rate is not less than the rate indicated at the Rate Position field in the ABR State table 160.

A block 260 reads the time period indicated in the Scheduler Period field in the current one of the Rate Decision Blocks 170 in FIG. 7. This is the Rate Decision Block selected in accordance with the functions indicated in the blocks 230, 236, 238, 244, 252 and 254 in FIG. 13*b*. This period indicates the time between successive RM cells in the transmit direction from the station A to the station B. As indicated at 262 in FIG. 13*b*, the Scheduler Period field in the ABR State table 160 in FIG. 7 is then set to the period indicated in the Rate Decision Block selected in accordance with the functions indicated in the blocks 230, 236, 238, 244, 252 and 254 in FIG. 13*b*.

As indicated at 260, the value in the Below Schedule field in the selected one of the Rate Decision Blocks 170 is also read. The rate indicated in such selected Rate Decision Block may be zero (0) or too slow to schedule. This is indicated by a binary 1 in the Below Schedule field in the newly selected one of the Rate Decision Blocks 170. The Schedule Forward Out of State Field in the ABR State table in FIG. 7 is then set to the value indicated in the Below Schedule field in the newly selected one of the Rate Decision Blocks 170. This is indicated at 264 in FIG. 13*b*.

When it is time to send an in rate cell in the transmit direction from the station A to the station B, a decision has to be made as to the type (forward RM cell, backward RM cell or data cell) that will be transmitted. This decision is triggered by an indication from the Scheduler 156 in FIG. 6 that it is time to send an in-rate cell on the connection represented in the drawings. If a decision is made that a forward RM cell is to be sent in the transmit direction from the station A to the station B, a check has to be made to determine which one of a number of different possible rates will be used. These checks are indicated in FIGS. 14*a* to 14*d*.

Figure 14A:
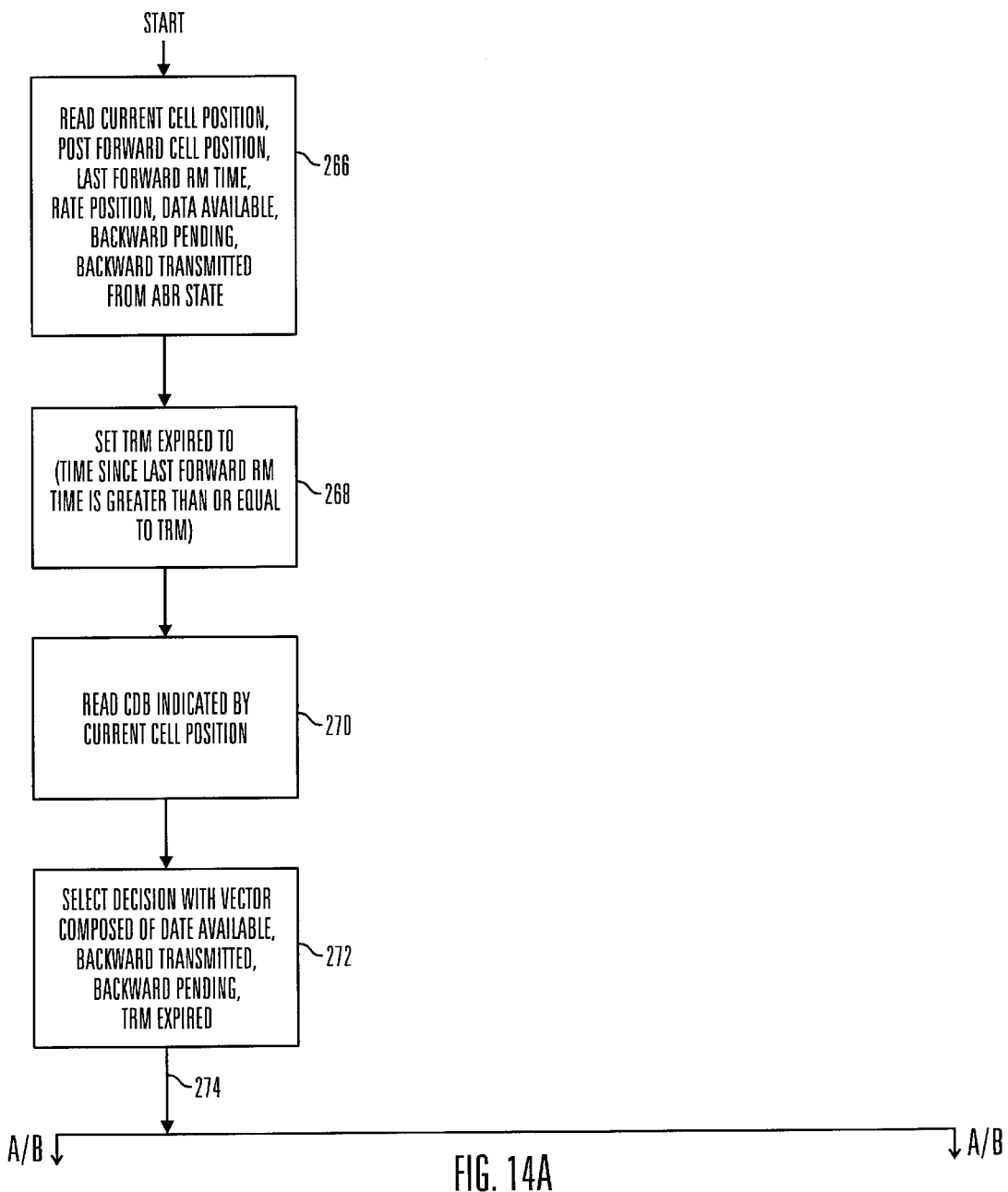

As a first step indicated at 266 in FIG. 14*a*, the Current Cell Position field is read from the ABR State table 160 in FIG. 7. The Current Cell Position field indicates which of the different cell decision blocks 164 will be used for the current cell. The Post Forward Cell Position field in the ABR State table 160 is also read. This indicates the selection of the top one of the cell decision blocks 160 in FIG. 7 after a forward RM cell has been read in one of the cell decision blocks 164. The Last Forward RM Time field is also read in the ABR State table in FIG. 7. This indicates the time of the last transmission of a forward RM cell in the transmit direction from-the station A to the station B. The different readings specified in this paragraph are included in a block 266 in FIG. 14*a*.

The Rate Position field in the ABR State table 160 in FIG. 7 is also read. As previously indicated, this indicates the new one of the Rate Decision Blocks 170 which is to be selected under certain circumstances as discussed almost immediately above in connection with FIGS. 13*a* and 13*b*. The Data Available field in the ABR State table 160 is also read. This indicates whether or not a data cell is available to be transmitted by the station A in the transmit direction from the station A to the station B. The different readings specified in this paragraph are also included in the block 266 in FIG. 14*a*.

The Backward Pending field in the ABR State table 160 is additionally read. This is a binary bit in the ABR State table 160 that indicates whether or not there is a backward RM cell waiting to be transmitted in the transmit direction from the station A to the station B. The Backward Transmitted field in the ABR State table 160 is also read. This is a binary bit in the ABR State table 160 that indicates whether a backward RM cell has been transmitted in the transmit direction from the station A to the station B since the last time that a forward RM cell has been transmitted in the transmit direction. The different readings specified in this paragraph are additionally included in the block 266 in FIG. 14*a*.

A check is then made in a block 268 in FIG. 14*a* to determine how long it has been since the last transmission of a forward RM cell in the transmit direction from the station A to the station B. This time is compared to the fixed time Trm. The result of this comparison is saved in a temporary storage. Since the storage is temporary, it is not in the ABR State table in FIG. 7.

The individual one of the cell decision blocks 164 in FIG. 7 is then read as indicated at 270 in FIG. 14*a*. This individual one of the Cell decision blocks 168 is indicated in the Current Cell Position field in the ABR State table 160 in FIG. 7. As shown in FIG. 7 for the block 164*a*, each of the cell decision blocks 164 has sixteen (16) different possibilities represented by four (4) binary values. However, only one of the sixteen (16) different possibilities is activated in the selected one of the cell decision blocks 164. This activated position indicates whether the type of cell in that block is a forward RM cell, a backward RM cell or a data cell.

The table for the selection of an individual one of the different types of cells is indicated at 166 in FIG. 9. This table indicates that a decision of the type of cell to be transmitted in the transmit direction from the station A to the station B is made on the basis of four (4) parameters: (a) Data available, (b) Backward RM Cell Transmitted since the last transmission of a forward RM cell, (c) Backward Pending RM cell and (d) the time since the last forward RM transmission in relationship to the value of TRM. Based upon these parameters, the block 272 provides an indication as to the type of cell to be transmitted. The type of cell selected for transmission is indicated by a line 274 at the bottom of FIG. 14*a* and the top of FIG. 14*b*.

Figure 14B:
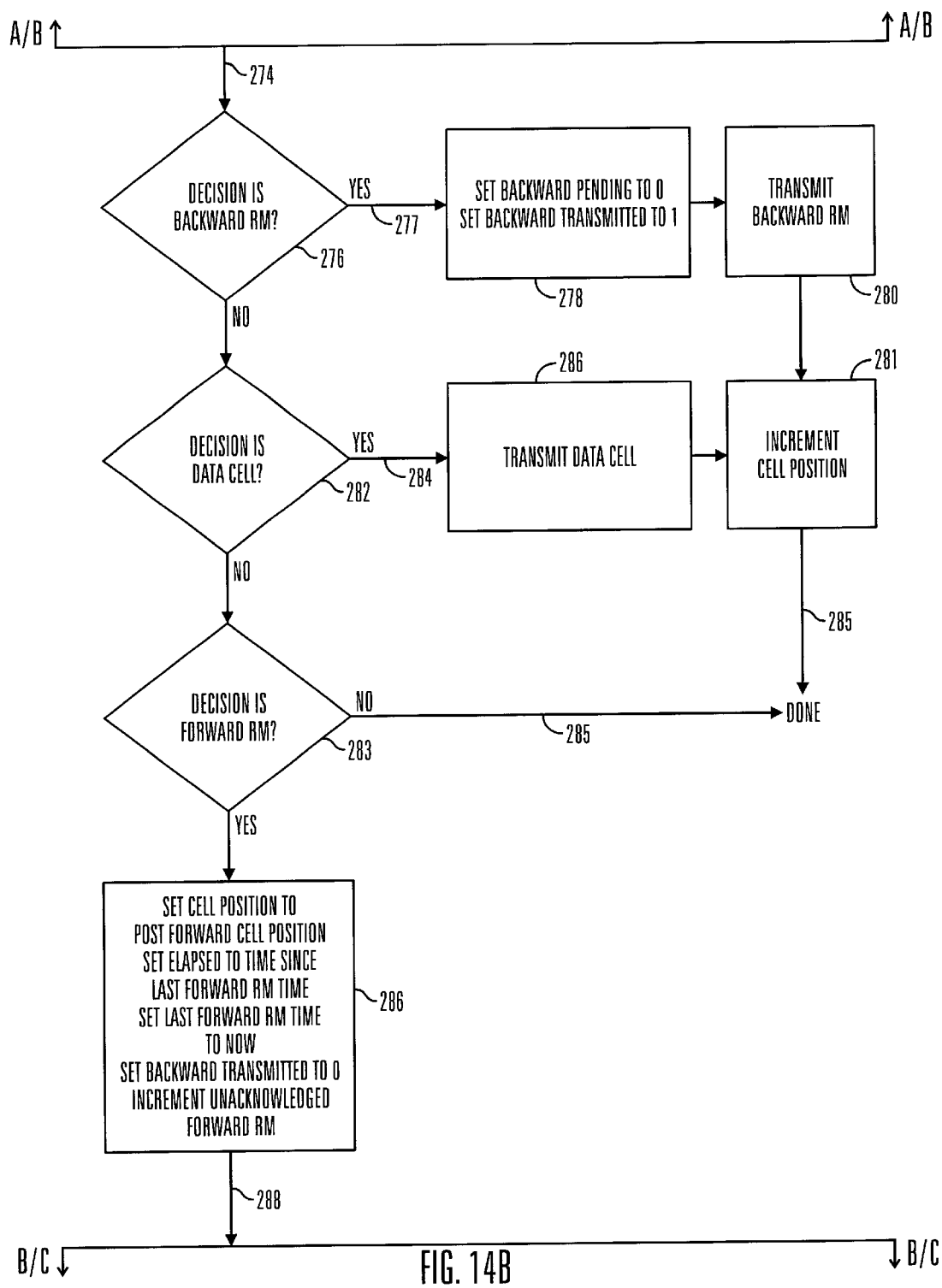

Decisions are then made in FIG. 14*b* as to what has to be done for each of the different types of cells that may be selected. For example, a decision is made in a block 276 as to whether the type of cell is a backward RM cell. If the answer is yes as indicated at 277, the Backward Pending field in the ABR State table 160 in FIG. 7 is set to a binary zero (0) and the Backward Transmitted field in the ABR State table is set to a binary 1, to indicate that the backward pending RM cell will be sent in the transmit direction from the station A to the station B. This is indicated at 278 in FIG. 14*b*. As indicated at 280 in FIG. 14*b*, an instruction is then provided to the Scheduler 156 in FIG. 6 to send the backward RM cell in the transmit direction from th station A to the station B. The cell decision block 164 is then incremented as indicated at 281 in FIG. 14*b*.

If the decision in the block 276 in FIG. 14*b* is that the type of cell is not a backward RM cell, a decision is then made in a block 282 in FIG. 14*b* as to whether the type of cell is a data cell. If the answer is yes, a signal is produced on a line 284 and the data cell is transmitted in the transmit direction from the station A to the station B. This is indicated at 286 in FIG. 14b. The activated one of the cell decision blocks 164 is then incremented as indicated at 281 in FIG. 14b.

If the decision in the block 282 is that the cell is not a data cell, a decision-is made in a block 283 as to whether the cell is a forward RM cell. If the answer is no, the processing is completed, just as it is when the cell decision block is incremented in the block 281. The completion of the processing is indicated on lines 285.

If the decision in the block 283 is that the cell is a forward RM cell, the Post Forward Cell Position field in the ABR State table 160 in FIG. 7 indicates that the cell decision block in FIG. 7 should be advanced to the cell decision block 164a. This is indicated in a block 286 in FIG. 14b. As indicated in the block 286, the Last Forward RM Time field in the ABR State table 160 in FIG. 7 is set to the then current time since a forward RM cell is about to be transmitted.

A temporary setting (not in the ABR State table 160) designated as Elapsed is provided to indicate the time since the transmission of the last previous forward RM cell in the transmit direction from the station A to the station B. Furthermore, since a forward RM cell is about to be transmitted, the Backward Transmitted field in the ABR State table 160 is set to a binary zero (0) to indicate that there are no backward RM cells since the transmission of the about-to-be transmitted forward RM cell. The count in the Unacknowledged Forward RM field in the ABR State table 160 is incremented. This count indicates the number of forward RM cells that have been transmitted in the transmit direction since the last time that a backward RM cell was sent in the transmit direction. All of the functions listed above in this paragraph are included in the block 286 in FIG. 14b.

Figure 14C:
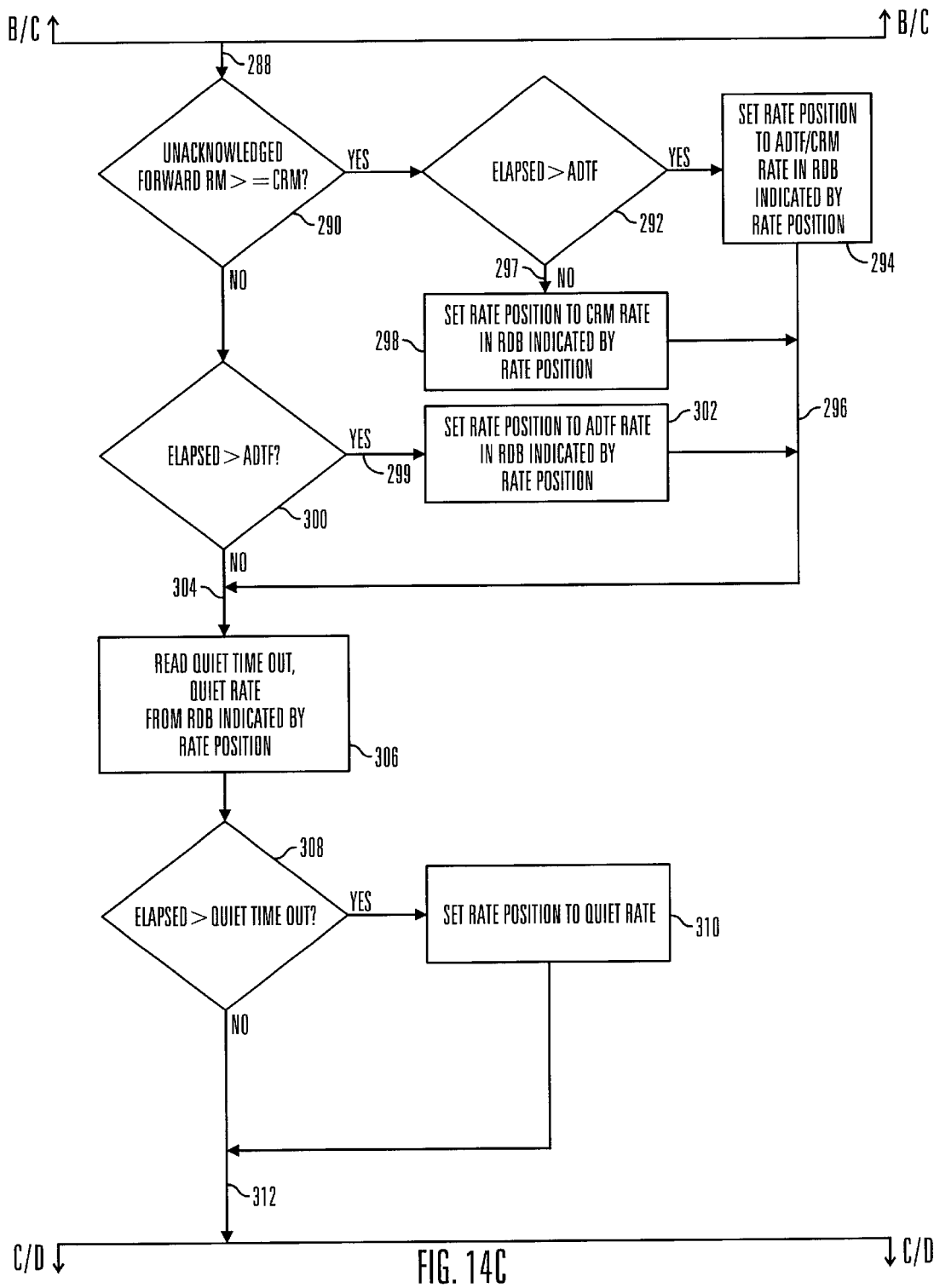

When all of the functions indicated in the block 286 have been accomplished, a signal is produced on a line 288 at the bottom of FIG. 14b and the top of FIG. 14c. The blocks in FIG. 14c check to see if any rate adjustments have to be made based upon the fact that a forward RM cell is being transmitted in the transmit direction from the station A to the station B. There are four (4)different paths in the upper half of FIG. 14. These four (4)different paths deal with decisions which are made based upon the ADTF Rate, the CRM Rate and the ADTF/CRM Rate specified in the bottom fields of each of the Rate Decision Blocks 170 in FIG. 7.

When a signal is produced on the line 288 in FIG. 14c, a determination is made in a block 290 as to whether the Unacknowledged Forward RM field in the ABR State table 160 in FIG. 7 is equal to or greater than the value of the CRM field in the ABR State table. As previously indicated, the Unacknowledged Forward RM field provides a count of the forward RM cells sent in the transmit direction since the reception of the last backward RM cell (with BN=0) in the receive direction. CRM is a fixed value which is selected for a particular connection.

If the answer is yes to the determination specified in the previous paragraph, a determination is made in a block 292 as to whether Elapsed (the temporary storage indicating the elapsed time since the last transmission of a forward RM cell in the transmit direction) is greater than the fixed value ADTF. If the answer is yes, the Rate Position in the ABR State table 160 is then set with the ADTF/CRM rate as indicated at 294. The setting of the new rate in the Rate Position in the ABR State table 160 is indicated by a signal on a line 296 in FIG. 14c.

If the value of the temporarily stored Elapse is not greater than ADTF, an indication is provided on a line 297. The CRM rate in the current rate decision block is then set in the Rate Position field in the ABR State table 160 as indicated at 298 in FIG. 14c. The setting of this new rate in the Rate Position field in the ABR State table 160 is indicated by a signal on a line 296 in FIG. 14c.

If the value in the Unacknowledged Forward RM field in the ABR State table 160 is less than CRM, a determination is made as at 300 as to whether the temporary value Elapsed is greater than the fixed value ADTF. If the answer is yes, the ADTF rate in the current rate decision block is then set in the Rate Position field in the ABR State table 160. The setting of this new rate in the Rate Position field in the ABR State table 160 is indicated at 302 in FIG. 14c.

If the source providing the different types of cells has become quiet for some time, the rate of cell transmission from the station A will be significantly below the allowed cell rate ACR. It would accordingly be desirable to change the current cell rate to a value close to the rate of the cells actually being transmitted. To determine this, the time since the last transmission of a forward RM cell in the transmit direction from the station A to the station B is determined. This time is compared to the time indicated in the Quite Time Out field in the currently selected one of the Rate Decision Blocks 170.

If the allowed cell rate ACR is relatively high, the time between the successive cells transmitted in the transmit direction should be relatively short. So the time in the Quiet Time Out field (in the currently selected one of the Rate Decision Blocks 170) representing a maximum time between successive ones of the Forward RM cells transmitted in the transmit direction will be relatively short. The values in the Quiet Rate field and the Quiet Time Out fields in the currently selected one of the Rate Decision Blocks 170 are read as indicated at 306 in FIG. 14c.

A determination is then made as to whether the temporary value Elapsed is greater than the value in the Quiet Time Out field in the currently selected one of the Rate Decision Blocks. This is indicated at 308 in FIG. 14c. If the answer is yes, the Rate Position in the ABR State table 160 is set to the Quiet Rate to decrease the allowed cell rate to a value closer to the actual transmission rate. This is indicated at 310 in FIG. 14c.

Figure 14D:
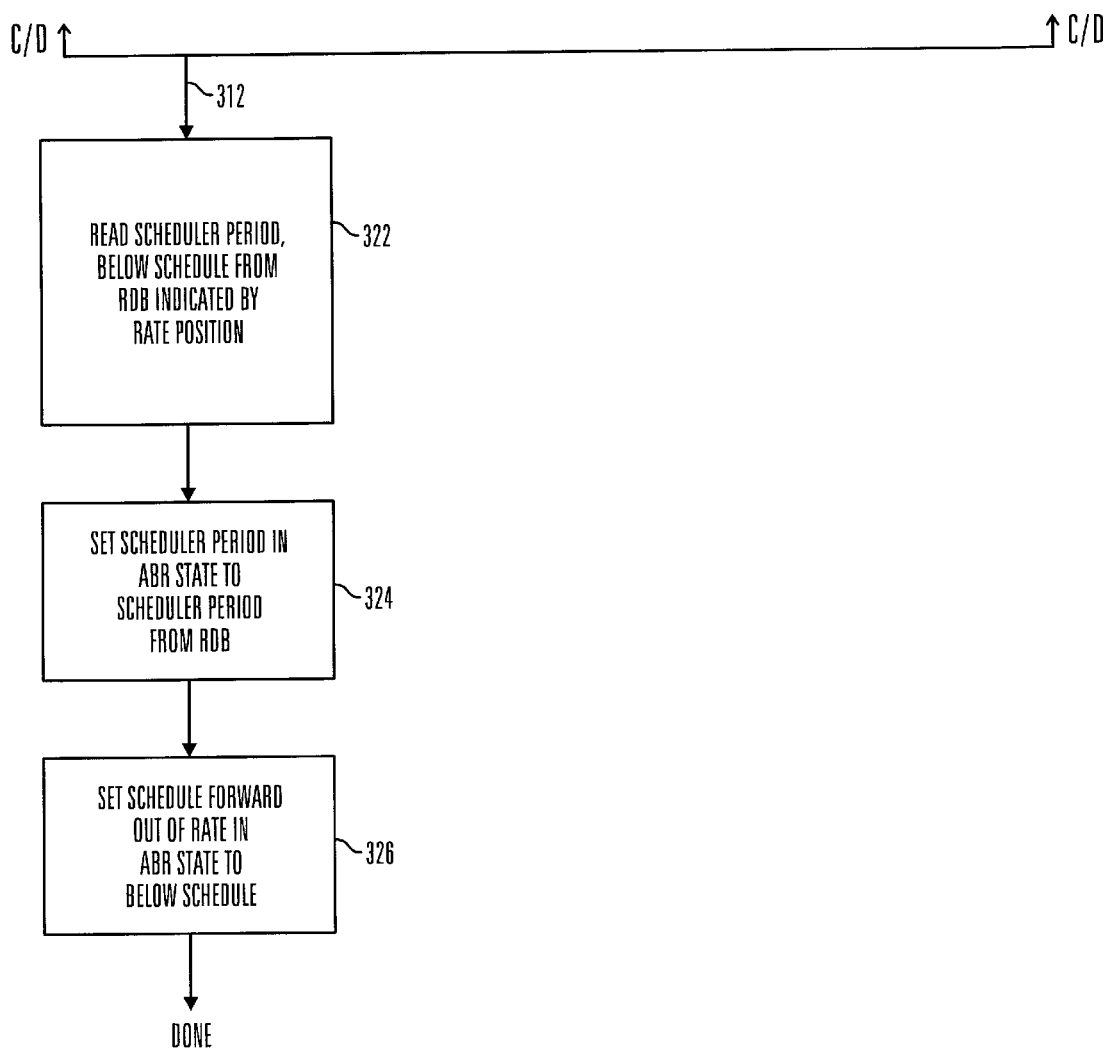

If the temporary value Elapsed is not greater than the value in the Quiet Time Outfield in the currently selected one of the Rate Decision Blocks 170, an indication is provided on a line 312 at the bottom of FIG. 14c and the top of FIG. 14d. Blocks 322, 324 and 326 in FIG. 14c respectively correspond in function to the blocks 260, 262 and 264 in FIG. 13b. The block 322 reads the time period indicated in the current one of the Rate Decision Blocks 170 in FIG. 7. This is the period indicated in the Rate Decision Block selected in accordance with the functions indicated in FIG. 14c. This period indicates the time between successive cells in the transmit direction from the, station A to the station B.

As indicated at 324 in FIG. 14d, the Scheduler Period in the ABR State table 160 in FIG. 7 is then set to the period indicated in the Rate Decision Block selected in accordance with the functions indicated in FIG. 14c. This period indicates the time between successive cells in the transmit direction from the station A to the station B.

The rate indicated in such selected Rate Decision Block may be zero (0) or too slow to schedule. This is indicated by a binary 1 in the Below Schedule field in the selected one of the Rate Decision Blocks 170. The Schedule Forward Out of State Field in the ABR State table in FIG. 7 is then set to the value indicated in the Below Schedule field in the newly selected one of the Rate Decision Blocks 170. This is indicated at 326 in FIG. 14d.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A method for operating an Asynchronous Transfer Mode (ATM) system, the method comprising:
   receiving a current cell transfer rate in a floating point format comprising a mantissa and an exponent;
   entering an exponent table with the exponent to determine a shift for the mantissa and an exponent base;
   shifting the mantissa based on the shift to determine a shifted mantissa;
   adding the exponent base to the shifted mantissa to determine a rate index; and entering a rate table with the rate index to determine a new cell transfer rate.

2. The method of claim 1 further comprising determining that congestion exists, and wherein entering the rate table with the rate index to determine the new transfer rate comprises entering the rate table with the rate index to determine a reduced cell transfer rate specified for the congestion.

3. The method of claim 1 further comprising determining that an increase is allowed, and wherein entering the rate table with the rate index to determine the new transfer rate comprises entering the rate table with the rate index to determine an increased cell transfer rate specified for the increase.

4. The method of claim 3 further comprising:
   comparing the increased cell transfer rate to an allowed cell transfer rate; and
   selecting the lower of the increased cell transfer rate and the allowed cell transfer rate as the new cell transfer rate.

5. The method of claim 1 wherein:
   entering the exponent table with the exponent to determine the shift for the mantissa comprises entering the exponent table with the exponent to select the shift for the mantissa from a plurality of possible shifts; and
   processing the shift to determine the rate index comprises processing the shift to determine the rate index from a plurality of rate indexes associated with the shift wherein lower shifts have more associated rate indexes than higher shifts.

6. The method of claim 1 further comprising determining a type of cell associated with the new cell transfer rate.

7. The method of claim 1 further comprising providing segmentation and re-assembly for available bit rate traffic including a cell associated with the new cell transfer rate.

8. The method of claim 1 further comprising selecting a table entry that includes data about a cell associated with the new cell transfer rate.

9. The method of claim 8 wherein the entry includes a bit that indicates if the cell is a data cell.

10. The method of claim 8 wherein the entry includes a bit that indicates if a backward resource management cell has been transmitted since a last forward resource management cell was transmitted.

11. The method of claim 8 wherein the entry includes a bit that indicates if a backward resource management cell is pending.

12. The method of claim 8 wherein the entry includes a bit that indicates if an elapsed time since a last forward resource management cell was transmitted exceeds a threshold.

13. An Asynchronous Transfer Mode (ATM) circuit comprising:
   a re-assembly block configured to receive ATM cells carrying information and to transfer the information to a memory;
   a segmentation block configured to receive the information from the memory and to segment and transfer new ATM cells carrying the information; and
   a manager and scheduler block coupled to the re-assembly block and the segmentation block and configured to receive a current cell transfer rate in a floating point format comprising a mantissa and an exponent and enter an exponent table with the exponent to determine a shift for the mantissa and an exponent base, shift the mantissa based on the shift to determine a shifted mantissa, add the exponent base to the shifted mantissa to determine a rate index, and enter a rate table with the rate index to determine a new cell transfer rate.

14. The circuit of claim 13 wherein the manager and scheduler block is configured to determine that congestion exists and enter the rate table with the rate index to determine a reduced cell transfer rate specified for the congestion.

15. The circuit of claim 13 wherein the manager and scheduler block is configured to determine that an increase is allowed and enter the rate table with the rate index to determine an increased cell transfer rate specified for the increase.

16. The circuit of claim 15 wherein the manager and scheduler block is configured to compare the increased cell transfer rate to an allowed cell transfer rate and select the lower of the increased cell transfer rate and the allowed cell transfer rate as the new cell transfer rate.

17. The circuit of claim 13 wherein the manager and scheduler block is configured to enter the exponent table with the exponent to select the shift for the mantissa from a plurality of possible shifts and process the shift to select the rate index from a plurality of rate indexes associated with the shift wherein lower shifts have more associated rate indexes than higher shifts.

18. The circuit of claim 13 wherein the manager and scheduler block is configured to determine a type of cell associated with the new cell transfer rate.

19. The circuit of claim 13 wherein the manager and scheduler block is configured to provide segmentation and re-assembly for available bit rate traffic including a cell associated with the new cell transfer rate.

20. The circuit of claim 13 wherein the manager and scheduler block is configured to select a table entry that includes data about a cell associated with the new cell transfer rate.

21. The circuit of claim 20 wherein the entry includes a bit that indicates if the cell is a data cell.

22. The circuit of claim 20 wherein the entry includes a bit that indicates if a backward resource management cell has been transmitted since a last forward resource management cell was transmitted.

23. The circuit of claim 20 wherein the entry includes a bit that indicates if a backward resource management cell is pending.

24. The circuit of claim 20 wherein the entry includes a bit that indicates if an elapsed time since a last forward resource management cell was transmitted exceeds a threshold.

* * * * *

UNITED STATES PATENT AND TRADEMARK OFFICE
CERTIFICATE OF CORRECTION

PATENT NO. : 6,301,226 B1
DATED : October 9, 2001
INVENTOR(S) : Bradford C. Lincoln It is certified that error appears in the above-identified patent and that said Letters Patent is hereby corrected as shown below:

<u>Title page,</u>
Item [54], the correct title should read -- ASYNCHRONOUS TRANSFER MODE SYSTEM AND METHOD --

Signed and Sealed this

Twenty-sixth Day of March, 2002

*Attest:*

*Attesting Officer*

JAMES E. ROGAN
*Director of the United States Patent and Trademark Office*